(12) United States Patent
Geusz et al.

(10) Patent No.: US 11,770,418 B2
(45) Date of Patent: Sep. 26, 2023

(54) METHODS, SYSTEMS, AND APPARATUS FOR CREDENTIAL FORMAT AND PROTOCOL MANAGEMENT

(71) Applicant: Ping Identity Corporation, Denver, CO (US)

(72) Inventors: Darrell Geusz, Castle Rock, CO (US); Bjorn Aannestad, Austin, TX (US); Gaurav Khot, Cupertino, CA (US); Alden Shiverick, Dallas, TX (US)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 18/162,472

(22) Filed: Jan. 31, 2023

(65) Prior Publication Data

US 2023/0247060 A1   Aug. 3, 2023

Related U.S. Application Data

(60) Provisional application No. 63/304,785, filed on Jan. 31, 2022.

(51) Int. Cl.
*H04L 9/40* (2022.01)

(52) U.S. Cl.
CPC ............ *H04L 63/20* (2013.01); *H04L 63/08* (2013.01); *H04L 63/102* (2013.01)

(58) Field of Classification Search
CPC ........ H04L 63/08; H04L 63/20; H04L 63/102
USPC .......................................................... 726/1
See application file for complete search history.

(56) References Cited

U.S. PATENT DOCUMENTS

| | | | |
|---|---|---|---|
| 9,641,335 B2 | 5/2017 | Bruce et al. | |
| 11,489,829 B1* | 11/2022 | Ulrich | H04L 63/083 |
| 2017/0048219 A1 | 2/2017 | Smith et al. | |
| 2021/0133350 A1* | 5/2021 | Kirti | G06F 21/6245 |

OTHER PUBLICATIONS

International Search Report and Written Opinion for International Application No. PCT/US2023/061646, dated Jun. 30, 2023, 9 pages.

* cited by examiner

*Primary Examiner* — Benjamin A Kaplan
(74) *Attorney, Agent, or Firm* — COOLEY LLP

(57) ABSTRACT

In an embodiment, a method includes receiving, by a processor and from a user device associated with a user, a request to access a service associated with a first protocol. The method further includes receiving, by the processor, a virtual credential of the user authorized by an authorizing entity. The virtual credential is compliant with a second protocol different than the first protocol. The method further includes verifying, by the processor, that the virtual credential is authorized by the authorizing entity. The method further includes transforming, by the processor, the virtual credential to generate a transformed virtual credential compliant with the first protocol. The method further includes sending, by the processor, a representation of the transformed virtual credential to the service. The method further includes verifying, by the processor and after the sending, that the transformed virtual credential is valid.

20 Claims, 11 Drawing Sheets

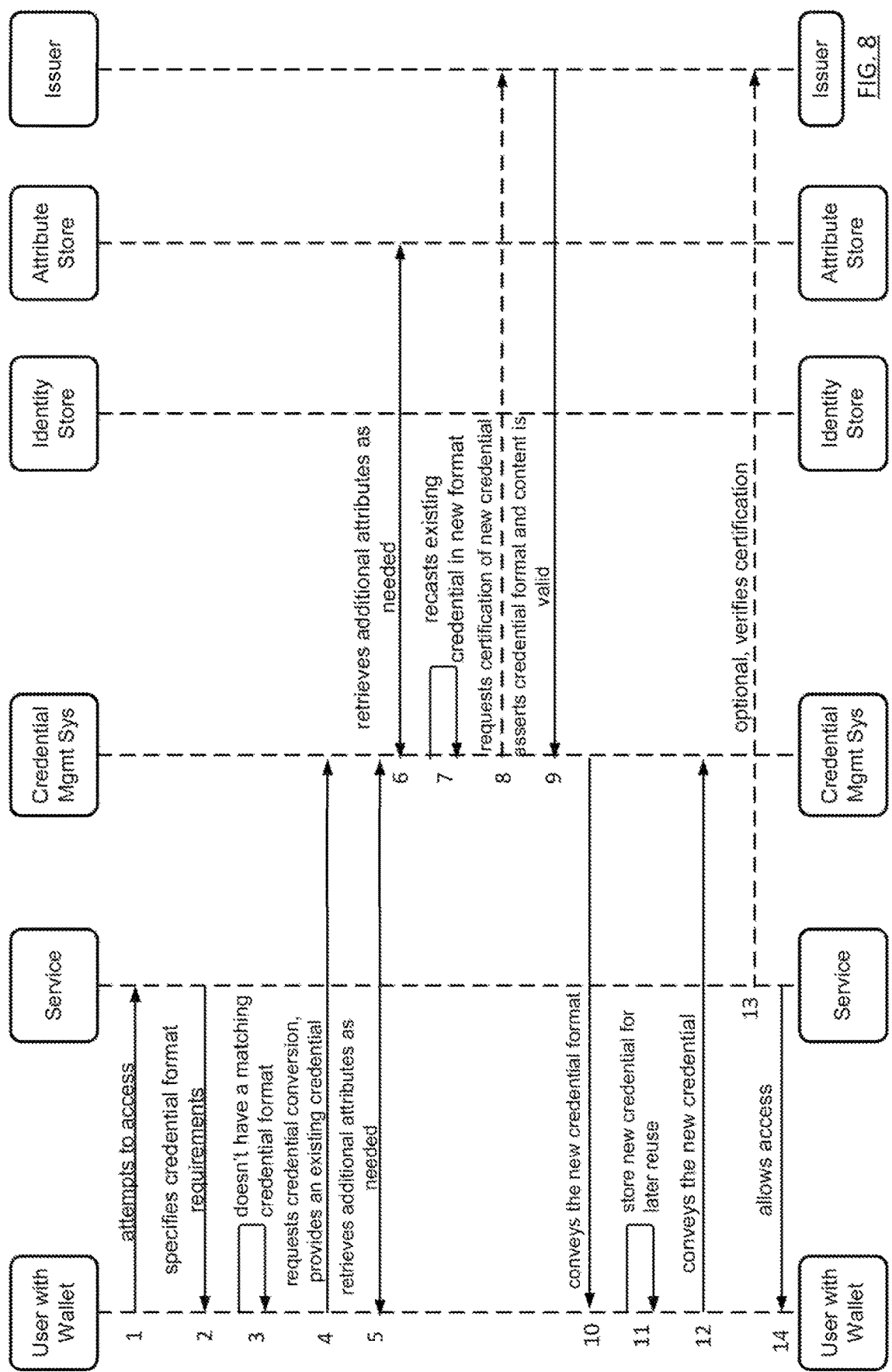

Receive, by a processor and from a user device associated with a user, a request to access a service associated with a first protocol
902

Receive, by the processor, a virtual credential of the user authorized by an authorizing entity, the virtual credential compliant with a second protocol different than the first protocol
904

Verify, by the processor, that the virtual credential is authorized by the authorizing entity
906

Transform, by the processor, the virtual credential to generate a transformed virtual credential compliant with the first protocol
908

Send, by the processor, a representation of the transformed virtual credential to the service
910

Verify, by the processor and after the sending, that the transformed virtual credential is valid
912

Receive, via a first compute device, a first set of data indicating a context of a second compute device associated with a user
1102

Receive, via the first compute device, a virtual credential associated with the user and that complies with a second protocol different than a first protocol
1104

Predict, via the first compute device, that the user is going to request access to a secured resource based on the first set of data and a second set of data indicating at least one previous resource access associated with at least one of the user or another user
1106

Determine, via the first compute device and in response to predicting that the user is going to request access to the secured resource, that access to the secured resource involves verification using the first protocol
1108

Transform, via the first compute device and in response to predicting that the user is going to request access to the secured resource, the virtual credential to generate a transformed virtual credential compliant with the first protocol
1110

Receive, via the first compute device, from the second compute device, after transforming the virtual credential to generate the transformed virtual credential, and after predicting that the user is going to request access to the secured resource, a request to access the secured resource
1112

FIG. 11

METHODS, SYSTEMS, AND APPARATUS FOR CREDENTIAL FORMAT AND PROTOCOL MANAGEMENT

CROSS REFERENCE TO RELATED APPLICATIONS

This application claims priority to and benefit of U.S. Provisional Application No. 63/304,785, filed on Jan. 31, 2022 and titled "METHODS, SYSTEMS, AND APPARATUS FOR CREDENTIAL FORMAT AND PROTOCOL MANAGEMENT," the disclosure of which is incorporated herein by reference in its entirety for all purposes.

FIELD

In one or more embodiments, virtual credentials are generated and managed to accommodate different formats and/or protocols.

BACKGROUND

Different service providers may request to view a credential prior to providing/performing respective services. For example, a bank may require seeing a driver's license or an identification (ID) prior to opening a bank account, while a bar may require seeing the driver's license or ID prior to serving alcohol. Some credentials are now implemented virtually within compute devices, such as a mobile phone. Different service providers may, however, need to receive a copy of or verify such virtual credentials using formats and/or protocols different than one another and/or different than the virtual credential itself.

Moreover, electronic devices may access various resources, such as files, databases, web pages, applications, services, and/or the like. Resources may use various techniques to verify users before account registration or access is allowed. Different resources may require different verification steps or protocols in order to obtain access.

SUMMARY

In one or more embodiments, a method includes receiving, by a processor and from a user device associated with a user, a request to access a service associated with a first protocol. The method further includes receiving, by the processor, a virtual credential of the user authorized by an authorizing entity. The virtual credential is compliant with a second protocol different than the first protocol. The method further includes verifying, by the processor, that the virtual credential is authorized by the authorizing entity. The method further includes transforming, by the processor, the virtual credential to generate a transformed virtual credential compliant with the first protocol. The method further includes sending, by the processor, a representation of the transformed virtual credential to the service. The method further includes verifying, by the processor and after the sending, that the transformed virtual credential is valid.

In one or more embodiments, an apparatus includes a memory and a processor operatively coupled to the memory. The processor is configured to receive, from a user device associated with a user, a request to access a service associated with a first protocol. The processor is further configured to receive a virtual credential of the user authorized by an authorizing entity. The virtual credential is compliant with a second protocol different than the first protocol. The processor is further configured to verify that the virtual credential is authorized by the authorizing entity. The processor is further configured to receive a representation of at least one attribute associated with the user and used by the first protocol but not included in the virtual credential. The processor is further configured to verify that the at least one attribute is valid. The processor is further configured to sign the at least one attribute with a private key to generate at least one signed attribute. The processor is further configured to transform the virtual credential to generate a transformed virtual credential compliant with the first protocol. The processor is further configured to send the transformed virtual credential and the at least one signed attribute to the service.

In one or more embodiments, a non-transitory processor-readable medium stores code representing instructions to be executed by a processor. The instructions comprise code to cause the processor to receive, via a first compute device, a first set of data indicating a context of a second compute device associated with a user. The instructions further comprise code to cause the processor to receive, via the first compute device, a virtual credential associated with the user and that is compliant with a second protocol different than a first protocol. The instructions further comprise code to cause the processor to predict, via the first compute device, that the user is going to request access to a secured resource based on the first set of data and a second set of data indicating at least one previous resource access associated with at least one of the user or another user. The instructions further comprise code to cause the processor to determine, via the first compute device and in response to predicting that the user is going to request access to the secured resource, that access to the secured resource involves verification using the first protocol. The instructions further comprise code to cause the processor to transform, via the first compute device and in response to predicting that the user is going to request access to the secured resource, the virtual credential to generate a transformed virtual credential compliant with the first protocol. The instructions further comprise code to cause the processor to receive, via the first compute device, from the second compute device, after transforming the virtual credential to generate the transformed virtual credential, and after predicting that the user is going to request access to the secured resource, a request to access the secured resource.

BRIEF DESCRIPTION OF THE DRAWINGS

FIG. 8 shows a diagram illustrating a process of granting a user access to a service using an identity store and attribute store, according to an embodiment.

FIG. 9 shows a flowchart of a method for transforming a virtual credential, according to an embodiment.

FIG. 11 shows a flowchart of a method of predicting that a user is going to request a secured resource, according to an embodiment.

DETAILED DESCRIPTION

Figure 1:
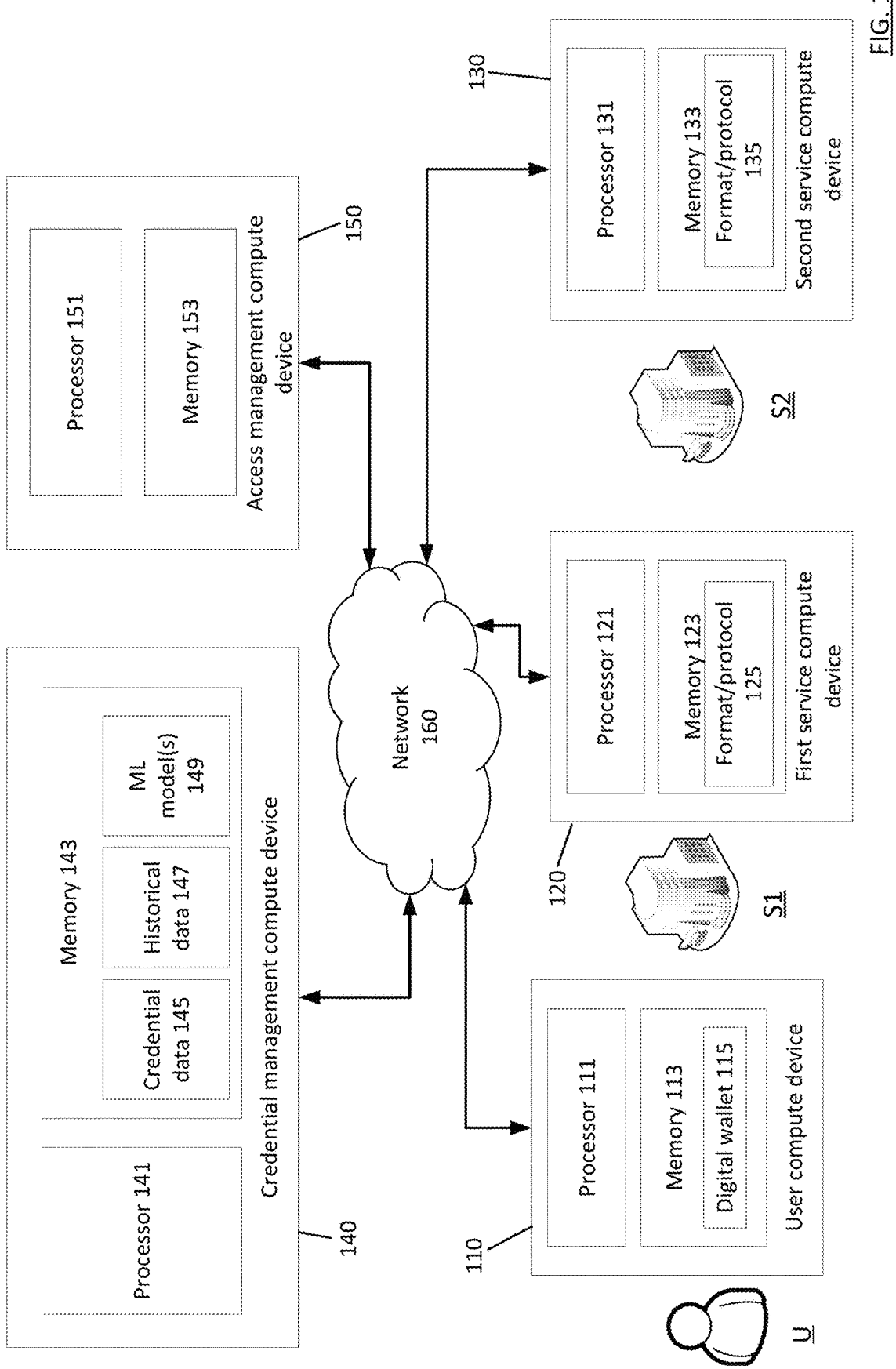
FIG. 1 shows a block diagram of a system for credential formatting and protocol management, according to an embodiment.

Credentials (e.g., driver's license, ID card, passport, vaccine card, etc.) can serve various functions, such as indicating a privilege to drive or verifying personal information (e.g., age, date of birth, address, etc.). Some entities, such as airports and banks, use such credentials prior to granting a user access to certain services offered by such entities. For example, a bank may verify a user's identity by requesting to view that user's driver's license. In some instances, such credentials can be verified using an electronic device, such as a mobile device with an app that includes a virtual credential that serves to replace a physical credential. For example, a mobile driver's license (mDL) is a mobile app that can replace a physical driver's license. Entities can use the mDL much like they would use a physical driver's license. It may be the case, however, that entities require and/or request the mDL to be presented according to a specific format/protocol. It may further be the case that different entities use different formats/protocols. With that context, the discussions herein are related to credential format and/or protocol management.

In one embodiment, the techniques described herein can allow a single credential, such as an mDL, to be used across multiple different formats/protocols used by different services/service providers by transforming that credential and/or managing transformed credentials. In some implementations, this can be desirable from a user (e.g., person making a service request) perspective. For example, the owner of that single credential does not need to transform their credential to meet various formats/protocols used by different services, nor does the owner have to manage their various transformed virtual credentials. Otherwise, that owner may, for example, miss out on a service, have to contact customer service, have to travel to that service-provider in person to verify their credentials, etc. In some implementations, the techniques described herein can also be desirable from a service-provider perspective; they can provide a service to a user with confidence that the credentials the service-provider receives are authorized and in the specific format and/or protocol they desire. Otherwise, that service-provider may verify and/or transform a user's credentials themselves (which can cost resources) and/or turn that service request down.

In some implementations, for example, a format/protocol refers to defined and/or established data (attribute) and associated metadata structure including mandatory, requested and/or optional data and metadata, data originality protections with verification methods, data integrity protections with verification methods, data security protections and/or verification methods, data (e.g., attribute) verification methods, transaction metadata structure, security and governance, levels of assurance, and/or data interface specification, for the implementation of a credential with a compute device. In some implementations, a protocol has a format. In some implementations, the protocol can be established by a particular governing organization, association or committee, for example, at least one of ISO 18013, ISO 23220 and/or family, W3C Verifiable Credentials and/or family, Decentralized Identity Foundation (DIF) and/or family, Hyperledger Indy and/or family, The Commons Project SMART and/or family, OpenID Foundation OpenID Connect (OIDC) and/or family, electronic IDentification, Authentication and trust Services (eIDAS) and/or family, International Civil Aviation Organization (ICAO) Digital Travel Credential (DTC), etc. In some instances, a family of a protocol can refer to predefined series of other protocols that includes the protocol.

FIG. 1 shows a block diagram of a system for credential formatting and protocol management, according to an embodiment. FIG. 1 includes a user compute device 110 associated with a user U, a first service compute device 120 associated with a first service S1, a second service compute device 130 associated with a second service S2, a credential management compute device 140, and an access management compute device 150. The user compute device 110, first service compute device 120, second service compute device 130, credential management compute device 140, and access management compute device 150, each of which can communicate (e.g., using respective communication interfaces (not shown)) via the network 160.

The user compute device 110 includes a processor 111 and a memory 113 operatively coupled to the processor 111. The memory 113 includes and/or stores a digital wallet 115, which can include representations of one or more authorized virtual credentials (e.g., driver's license, ID, passport, debit card, student ID, employee badge, boarding pass, ticket, coupon, birth certificate, vaccine card, account profile, etc.) that follow/support and/or is compliant with a first standard format/protocol. In some implementations, the digital wallet 115 includes an mDL and/or mobile ID (mID) approved by a government (e.g., state of Colorado) that follows and supports a first standard format and/or protocol (e.g., ISO 18013-5/-7).

In an example scenario, the user U wants to use the first service S1 and second service S2. For example, if the first service S1 is a first bank and the second service S2 is a second bank different than the first bank, the user U may want to open a checking account at the first bank S1 and a savings account at the second bank S2.

Regarding the first service S1, the first service compute device 120 associated with the first service S1 includes a processor 121 and a memory 123 operatively coupled to the processor 121. The memory 123 includes a representation of a format/protocol 125 that defines the format/protocol standard required and/or preferred by the first service compute device 120/first service S1. For example, the format and/or protocol 125 may use ISO 18013/-5/-7. As another example, the format and/or protocol 125 may support ISO 18013/-5/-7, but require and/or desire the credential format and/or protocol presented to the first service compute device 120 to have additional identity claims (e.g., social security number, employer, salary, etc.) verified and added to the ISO 18013/-5/-7 payload. As another example, the format/protocol 125 may require and/or use the W3C DIF standard format and/or protocol.

The credential management compute device 140 includes a processor 141 and a memory 143 operatively coupled to the processor 141. The memory includes credential data 145, historical data 147, and machine learning (ML) model(s) 149. The credential management compute device 140 can be aware of and/or able to parse the format/protocol 125 required, used and/or preferred by the first service S1 by: (1) receiving a copy of all or portions of the format/protocol 125 (e.g., from the first service compute device 120) and storing that copy in the memory 143, and/or (2) reading the format/protocol 125 in substantially real time at the time of a transaction (e.g., via an API call or connector) from the first service compute device 120 and/or the access management compute device 150.

In response to the user U requesting to use the first service S1 and/or indicating that the first service S1 may be repeatedly (e.g., frequently, occasionally) used by the user U (prior to the user U requesting to use the first service S1), the credential management compute device 140 can recognize and/or identify that a format/protocol associated with a requested virtual credential in the digital wallet 115 (e.g., mDL of the user U) is in a format/protocol different than that required, used and/or preferred by the first service compute device 120. Thereafter, the credential management compute device 140 can send a signal to cause the user compute device 110 to request consent from the user U to transform and/or share their transformed virtual credential with the first service compute device 120. The user compute device 110 can also receive input from the user U regarding where the transformed virtual credential should be stored after it has been generated. For example, the transformed virtual credential can be stored at the digital wallet 115 and/or stored as part of the credential data 145 of the credential management compute device 140 for future reuse. Alternatively, the user U can request that the transformed virtual credential is not stored.

After receiving consent from the user U, the user compute device 110 can share the requested virtual credential from the digital wallet 115 to the credential management compute device 140. The credential management compute device 140 can receive and verify the virtual credential to ensure that the virtual credential is authentic and/or still valid. The verifying can include, for example, verifying that attributes of the virtual credential, specified in the format/protocol 125, have been signed by the private key of an authorized entity (e.g., government). Alternatively, the user compute device 110 associated with the user U can share the requested virtual credential from the digital wallet 115 to a second user compute device (not shown in FIG. 1; different than and communicably coupled to user compute device 110) associated with a second user (not shown in FIG. 1; different that user U). The second user compute device can receive and verify the virtual credential to ensure that the virtual credential is authentic and/or still valid. In some implementations, after successful verification and receiving consent from the user U, the second user compute device can store the virtual credential within a second digital wallet (not shown in FIG. 1) associated with (e.g., stored in) the second user compute device and associated with (e.g., managed by, accessible by) the second user for subsequent presentation and/or sharing with 3rd parties on behalf of user U.

After verifying the virtual credential, the credential management compute device 140 can indicate that the verification was completed successfully by notifying the first service compute device 120 and/or access management compute device 150. Additionally or alternatively, such assertion can be encapsulated inside a transformed virtual credential having a format/protocol as outlined in the format/protocol 125 (which is to be sent from the credential management compute device 140 to the first service compute device 120 and/or access management compute device 150, as described further herein).

The credential management compute device 140 can transform the virtual credential having a first format/protocol into a transformed virtual credential having a second format/protocol different than the first format/protocol and as requested by the format/protocol 125. For example, tables of equivalencies, rules, routines, look up tables, and/or the like can be used to transform the virtual credential into the transformed virtual credential. In some implementations, the original signed attributes can remain intact, are not extracted, and are repackaged before transforming into a second format/protocol. In some implementations, some or all the data is extracted, reformatted and/or truncated, attribute equivalencies substituted, and some or all attributes and/or equivalents repackaged and signed using a new private key. In some implementations, semantic model(s) can be used leveraging ontologies and taxonomies to accomplish the transformation. In some implementations, only the protocol used to wrap and transfer/transmit the virtual credential differs. In some implementations, an ML model(s) 149 can be trained to transform virtual credentials into a different format/protocol. For example, the ML Model(s) 149 can include a neural network trained using virtual credentials having the first format/protocol as input training data and transformed virtual credentials having the second format/protocol as output training data.

In some implementations, transforming virtual credentials can use and/or request additional information from the user U prior (e.g., social security number, employer, and/or salary information not disclosed by a mobile driver's license). In such a scenario, the credential management compute device 140 may send a signal to cause the user compute device 110 to collect the additional information (e.g., from the user U, from the memory 113, etc.). For example, the user compute device 110 can request the user U to type and/or select from a list the additional information outlined by the format/protocol 125. Upon collecting the additional information, the user compute device 110 can send a representation of that additional information to the credential management compute device 140. Thereafter, the credential management compute device 140 can verify the additional information with a third party authoritative system of record (not shown) and/or by verifying another credential available in the digital wallet 115 or credential data 145 (e.g., verifying an entered social security number using a virtual social security card).

After the credential management compute device 140 has generated the transformed virtual credential (e.g., using ML model(s) 149), the credential management system 140 can share the transformed virtual credential to at least one of the first service compute device S1 or the access management compute device 150. Furthermore, in scenarios where additional information about the user U not included in the virtual credential was collected (e.g., social security number, employer, salary information, etc.), the credential management compute device 140 can sign the additional information using an internal private key or an approved private key provided by an authorized entity (e.g., government that issued the virtual credential) for sending within the transformed virtual credential.

In some implementations, the credential management compute device 140 stores a chain-of-trust (e.g., links and binding) between the virtual credential and the transformed virtual credential, along with any metrics and metadata about the transaction, as part of the credential data 145 and/or historical data 147. This stored chain-of-trust information allows for reuse and/or verification of the virtual credential/transformed virtual credential (e.g., at the first service S1) without having to regenerate the transformed virtual credential.

In some implementations, the credential management compute device 140 can determine and/or be aware of the user's U location. That way, if the user U is at a location where transforming credentials is not allowed, or that location has local requirements that are to be complied with, the credential management compute device 140 can accommodate accordingly (e.g., denying access to the service, transforming user credentials according to the local requirements, etc.).

In some implementations, the credential management compute device 140 can predict (e.g., using the ML model(s) 149) that the user U is going to request a service before the user U makes such a request. In some implementations, previous user U behavior and/or previous behavior of other users can be analyzed for patterns to predict that the user U is going to request a service before that user U actually makes the request. Additional factors, such as location of the user U, attributes of the user U (e.g., age, interests, gender, salary, occupation, etc.), time of day, applications running on the user compute device 110, and the like can also be considered for predicting that the user U is going to make a request. If such a prediction is made, the credential management compute device 140 can perform one or more of the following prior to the user U making a service request: (1) determine a format/protocol used by that service-provider, (2) transform a virtual credential associated with the user into the format/protocol used by that service-provider, (3) cause the transformed virtual credential to be stored (e.g., at credential data 145, at digital wallet 115), and/or (4) provide the transformed virtual credential to that service provider. In some implementations, performing any of the foregoing prior to the user U making the request can allow a transformed virtual credential to be generated faster, and as a result, allow the user U to access a service faster, finish the service faster, and/or access a service that could have accessed not otherwise (e.g., because the service-provider closed or is too full).

The second service compute device 130 is associated with the second service S2 and includes a processor 131 and memory 133 operatively coupled to the processor 131. The memory 133 includes (e.g., stores) a format/protocol 135 (and/or stores requirements to access service S2 which can include having a credential in a format that complies with a protocol) that may be the same as or different than the format/protocol 125 included in the first service compute device 120. In a scenario where the format/protocol 135 of the second service compute device 130 is different than the format/protocol 125 of the first service compute device 120, a similar process to that described with respect to generating the transformed virtual identity according to the format/protocol 125 can be applied, the difference being the virtual identity is transformed according to the format/protocol 135 used and/or preferred by the second service compute device 130.

In some implementations, after transforming, the chain-of-trust, along with metrics and metadata about the new transaction, can be stored as part of the credential data 145 and/or historical data 147. Thus, the credential data 145 can serve to store one or more transformed versions of one or more virtual credentials for future reuse, and the historical data 147 can maintain a log of various transformations and/or reuses that have occurred. Thus, if a third service compute device (not shown) associated with a third service requests a transformed virtual credential having a format/protocol that is the same as format/protocol 125 and/or 135, the transformed virtual credential generated to have the format/protocol 125 and/or 135 can be reused by the third service compute device.

The access management compute device 150 includes a processor 151 and memory 153 operatively coupled to the processor 151. The access management compute device 150 can serve to perform additional data processing for communications between the credential management compute device 140 and the first service compute device 120, and between the credential management compute device 140 and the second service compute device 130. In some implementations, the access management compute device 150 verifies the virtual credential and manages subsequent access to the service compute device 120 and/or 130 as a federated process. In some implementations, the access management device 150 stores the format/protocol 125 and/or 135 policy, format and/or requirements on behalf of the associated service compute device 120 and/or 130. In some implementations, the access management compute device 150 serves as the central identity management system, identity record data store, and/or identity attribute data store. In some implementations, the access management compute device 150 serves as the central authorization/privilege management and data store. In some implementations, however, the access management compute device 150 can be omitted. In such a scenario, the credential management compute device 140 can communicate directly (or not via access management compute device 150) with the first service compute device 120 and the second service compute device 130 (e.g., via network 160).

In some implementations, if the virtual credential is no longer usable and/or going to be unusable (e.g., driver's license has been revoked), the credential management compute device 140 may perform one or more remedial actions. For example, the remedial action can include automatically revoking any transformed virtual credentials generated using the virtual credential. As another example, the remedial action can include notifying at least one of the user compute device 110, first service compute device 120, or the second service compute device 130 that the virtual credential is going to be unusable at a specified time/date. As another example, the remedial action can include causing the user compute device 110 to determine if the user U would like to use a different virtual credential, and if the user U indicates that they do, generate a new transformed virtual credential using that different virtual credential (e.g., using an mID instead of an mDL).

The user compute device 110, first service compute device 120, second service compute device 130, credential management compute device 140, and access management compute device 150 can be, for example, any type of computer, server, mobile device, smart watch, internet-of-things device, etc. that has a processor that executes instructions such as software instructions stored in a memory. Each of the processors 111, 121, 131, 141, 151 can be, for example, a hardware based integrated circuit (IC) or any other suitable processing device configured to run or execute a set of instructions or a set of codes. For example, each of the processors 111, 121, 131, 141, 151 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. Each of the processors 111, 131, 131, 141, 151 can be operatively coupled to respective memories 113, 123, 133, 143, 153 through a system bus (for example, address bus, data bus, and/or control bus. The memories 113, 123, 133, 143, 153 can store electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc.

In some embodiments, the network 160 can be any suitable communications network for transferring data, operating over public and/or private networks. For example, the network 160 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 160 can be a wireless network such as, for example, a Wi-Fi or wireless local area network ("WLAN"), a wireless wide area network ("WWAN"), and/or a cellular network. In other instances, the network 160 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 160 can be encrypted or unencrypted. In some instances, the communication network 160 can include multiple networks or subnetworks operatively coupled to one another by, for example, network bridges, routers, switches, gateways and/or the like (not shown).

In some implementations, methods, systems, and apparatus, including computer-readable media, are related to credential format and/or protocol management. In some implementations, a computing device (e.g., credential management compute device 140 of FIG. 1) receives data indicating a current context of a client device (e.g., user compute device 110 of FIG. 1) associated with a particular user (e.g., user U of FIG. 1). The computing device accesses first credential data that demonstrates that the particular user has been verified using a first credential format/protocol.

In some implementations, the computing device (e.g., credential management compute device 140 of FIG. 1) determines that (1) the particular user is likely to request access to a service and/or secured resource (e.g., at first service compute device 120 of FIG. 1, at second service compute device 130 of FIG. 1) based on the current context of the client device and data indicating one or more previous services and/or resource accessed by the particular user, or (2) determines the particular user is requesting access to the service or secured resource for the current transaction.

In some implementations, the computing device (e.g., credential management compute device 140 of FIG. 1) determines that access to the service and/or secured resource involves verification using a second credential format and/or protocol that is different from the first credential format and/or protocol. In response, the computing device transforms the particular user credential data using the second credential format and/or protocol and provides the second credential for the particular user to access the service or secured resource.

In some implementations, the computing device (e.g., credential management compute device 140 of FIG. 1) maintains a chain-of-trust between the particular user, the first credential format and/or protocol, the verification results of the first credential, and the second credential format and/or protocol. The computing device offers the particular user to keep a copy of one or both credentials for use again later.

In some implementations, a credential management system (e.g., credential management compute device 140) can manage credentials on behalf of a user (e.g., user U) so the user does not need to request the additional credential format and/or protocol from the issuer of the credential previously issued to the user. In some implementations, the credential management system can orchestrate the transformation, conversion or translation of the user's credential to another credential format and/or protocol corresponding to the requested service. In some implementations, the credential management system may dynamically provide a user the required and/or requested credential format and/or protocol used to access or register with one or more services based on telemetry, context, and behavior analysis of the user.

In some implementations, a credential management system (e.g., credential management compute device 140) provides a capability to verify credentials of various issuer types, issuers, formats and protocols, and also issue credentials of various formats and protocols. For example, the credential management system can provide a layer of abstraction to manage credentials for a user to access resources, regardless of the specific credential format and/or protocol used by the individual resources. As a result, the credential management system can automatically obtain and maintain credentials on behalf of a user across multiple credential formats and protocols. This allows the management server to provide a bridge for identity verification across resources by extending credentials required and/or used by one resource or protocol to match the format required and/or used by another resource or protocol.

In some implementations, the credential management system (e.g., credential management compute device 140 of FIG. 1) can manage credentials on behalf of a user so the user does not need to request the additional credential format and/or protocol from the issuer of the credential previously issued to the user. In some arrangements, a user can obtain access to services using a particular credential format and/or protocol, such as to open a bank account online. However, access to additional services outside that bank account may require and/or use separate credential formats and protocols to sign in or register an account. With the credential management system discussed herein, in some implementations, the user can present a single credential format and/or protocol to the credential management system, and the system can dynamically create and/or generate the credential format and/or protocol required and/or used by each of the requested services. The user provides credentials to the credential management system (e.g., using the user compute device 110), and the credential management system takes the steps to generate the properly formatted credential and execute the underlying supporting credential protocol to register an account with, or gain access to, the requested service.

In some implementations, the user may request access to a service (e.g., at first service compute device 120, second service compute device 130, and/or the like) that does not exist on a local network. In particular, this service may be accessed over the Internet or on another third-party network. Additionally, for the user to access this service, the user may present a different credential format and/or protocol than that of the user's first credential format and/or protocol. The user can request access to the external service using the credential management system, including in conjunction with an identity & access management system (e.g., access management compute device 150 of FIG. 1). As such, the credential management system orchestrates the gathering and retrieving of the necessary, desired and/or used credential format and/or protocol used to access the external service using the different credential format and/or protocol.

In some implementations, the credential management system can orchestrate the transformation, conversion or translation of the user's credential to another credential format and/or protocol associated with and/or used by the requested service. The credential management system can analyze the received request from the user to determine the credential format and/or protocol required and/or used for the user. If the user passes the credential verification test, the credential management system can (1) transmit an indication of verification success, and (2) determine the information and process required and/or used to transform, convert and/or translate the received credential format and/or protocol, including any encapsulated or linked attributes, into the service's required and/or used credential format and/or protocol to provide the necessary and/or used credential information (second credential), including any encapsulated or linked attributes, to the requested service using the service's required and/or used credential or credential verification protocol. If the credential management system also verifies the user's second credential for the service, the requested service can transmit an indication of verification success to the service, and subsequently, to a client device of the user at the discretion of the service.

The credential management system can provide a transparent credential format and/or protocol translation process. In some implementations, the credential management system can issue an additional credential format or protocol for the user without any indication to the user that another credential format and/or protocol is necessary and/or used to access the requested service. In this regard, the credential management system automatically (e.g., without human intervention) translates the user's credential format and/or protocol to another credential format and/or protocol on the user's behalf in a transparent manner for the user to request access to the service. In some implementations, this transparent translation can improve identity verification process efficiency because the user need not manually request additional credential formats and/or protocols from the original credential issuer. Additionally, the user can access the new service without changing credential presentation or verification protocols. As a result, in some implementations, the user can present a single verifiable credential of sufficient strength to the credential management system to access multiple services supported by the credential management system.

In some implementations, the credential management system combines credential management with an adaptive credential format and/or protocol switch. A user can be recognized from an identity verification completed for a particular service and an identity of the user can be associated with one or more credential formats and/or protocols used by other services. The credential management system can recognize a user from an identifier found in the request or based on a type of the request, for example. The service and associated credential format and/or protocol requirements can be recognized based on previous requests sent by the same user, techniques used by the credential management system that predict services that the user may request, or one or more services found in the user's request, to name a few examples. Additionally, the credential management system can identify the credential format and/or protocol used by the user. Based on the identified user and the request, the credential management system can determine whether to employ adaptive credential format and/or protocol switching. The adaptive credential format and/or protocol switching seeks to use the identified credential format protocol in the request and efficiently switch to a credential format and/or protocol required and/or used for communicating with the determined service. The credential management system can learn to adaptively switch between two credential formats and/or protocols from previous requests, learning to switch between two different credential formats and/or protocol types while the system is offline, or receiving instructions on how to switch between two credential formats and/or protocol types. Thus, when the credential management system is online and receives a request from a user using a credential format and/or protocol type, the credential management system can adaptively switch the credential and/or protocol types required and/or used to access or register with a service requested for by the user with minimal delay time.

In some implementations, a multi-factor enablement layer may be provided by the credential management system, or a connected identity and access management system, for a user requesting access to a particular service. To provide a more secure environment, the credential management system can require and/or request the user to provide an additional method of identity verification using one or more credential formats or protocols and/or identity verification methods. Additionally, in some implementations, the credential management system may require and/or request the user to verify their identity using various devices. In some implementations, the credential management system may perform multi-factor authentication on a routine basis (e.g., daily, weekly, monthly, etc.).

In some implementations, the credential management system may dynamically provide a user the credential format and/or protocol required and/or used to access or register with one or more services based on telemetry, context, and behavior analysis of the user. The credential management system may pre-allocate credential format and/or protocol transformation, conversions and/or translations, including for any encapsulated or linked attributes, for a user based on the telemetry, context, and the behavior of the user. For example, if the user is traveling from one location to another, the credential management system may automatically (e.g., without human interaction) transform, convert or translate to the typical credential format and/or protocol required and/or used for a user based on a particular region and a service geographic entrypoint requirement.

In some implementations, a user's access to the particular credential format and/or protocol for access to, or to register with, a service may be granted or denied based on a location (e.g., global positioning system (GPS) location) of the user. For example, the credential management system can deny a user's access to a credential format and/or protocol for the requested service available only in South America, when the user's GPS indicates their location is in Asia. In some implementations, the credential management system may analyze the context of the user to determine whether to grant or deny the particular credential format and/or protocol to the user that is used to access the resource. For example, context can include location, time of day, type of device, type of or strength of the credential and protocol being used to request service, and/or the confidence level of the verification results for the provided credential being used to request service. In some implementations, the credential management system may analyze the behavior of the user to determine whether to grant or deny access to the credential management system. For example, the behavior can include frequency of previous use of either the provided credential and protocol or the requested service, previous lengths of time for using the credential or similar credentials or the requested service, use of the credential or similar credentials to access other services, and/or whether or not the user has previously used the credential and/or service past his or her approved expiration date or duration time.

In an embodiment, one or more computers (e.g., credential management compute device 140) receive data indicating a current context of a client device (e.g., user compute device 110) associated with a particular user or credential. The one or more computers access first data that demonstrates that the particular user has been verified using a first credential format and/or protocol. The one or more computers determine that the particular user is likely to request access to a secured resource (e.g., first service S1, second service S2) based on the current context of the client device and data indicating one or more previous resource accesses by the particular user. The one or more computers determine that access to the secured resource involves verification using a second credential format and/or protocol that is different from the first credential format and/or protocol. In response to determining that the particular user is likely to request access to a secured resource and based on the first credential format and/or protocol data demonstrating that the particular user has been verified using the first credential format and/or protocol, the one or more computers verify the particular user using the second credential format and/or protocol. The one or more computers establish a verified credential for the particular user to access the secured resource. In some implementations, the one or more computers may provide credential verification data to the client device that enables the client device to access the secured resource using the verified credential.

In some implementations, a credential management system may request, capture, and bind the user's consent to both share the first credential, as well as transform or issue the second credential and then subsequently share the second credential with the secure resource on the user's behalf. In some implementations, the credential management system may communicate with an authorization management system to incorporate or reflect privileges managed by the authorization management system into the credential. In some implementations, the credential management system may communicate with an identity and access management system (e.g., access management compute device 150) to incorporate attributes, or incorporate or reflect privileges, managed by the identity and access management system into the credential. In some implementations, the credential management system may also share credentials with other third party systems across multiple data transport, exchange and authentication protocols such as, for example, Resource Description Framework (RDF), Extensible Markup Language (XML), and JavaScript Object Notation (JSON).

In some implementations, one or more compute devices can determine that access to the service or secured resource includes formatting the credential for use in at least one of Open Authentication protocol, Security Assertion Markup Language (SAML), OpenID connect (OIDC), JSON Web Tokens (JWT), Kerberos, or Open Web Application Security Project (OWASP).

In some implementations, the original issuer (entity) of the first credential reviews and certifies either the second credential format and/or protocol template used for the transformation, or the second credential issued by the credential management system. This certification may include, for example, an icon, seal, signing key or digital signature attached to the credential format and/or protocol template, each individual second credential transformed or issued by the credential management system based on the original issuer's credential, or one or more attributes stored within the second credential transformed or issued by the credential management system based on the original issuer's credential.

In some implementations, the secured resource includes a data source, a document, a web page, a network-based application, a network-based service, a remote computer system, and/or the like.

Some implementations can include (1) determining (e.g., by credential management compute device 140) based on a stored profile for the secured resource or communication with the secured resource, that the first credential format and/or protocol is not supported by the secured resource but that the second credential format and/or protocol is supported by the secured resource, and/or (2) determining (e.g., by credential management compute device 140), based on a management profile, that a management policy directs use of the second credential format and/or protocol in addition to other requirements of the secured resource. Afterwards the appropriate credential format and/or protocol can be automatically (e.g., without human intervention) retrieved/used (e.g., by the credential management compute device 140) if already available or authorized for the user; otherwise an existing credential format/protocol can be transformed (e.g., by the credential management compute device 140) into the proper credential format and/or protocol as needed and/or requested (with or without consent based on configuration and user settings).

Some implementations can include issuing (e.g., by credential management compute device 140) the second credential data by providing the second credential data before receiving the request from the client device to access the secured resource. Before receiving the request from the client device to access the secured resource, the credential format and/or protocol for the particular user to use along with the required and/or used credential protocol with the secured resource can be issued (e.g., by credential management compute device 140). Credential verification data for the particular user to access the secured resource can be stored (e.g., by credential management compute device 140). In some instances, providing (e.g., by credential management compute device 140) the credential verification data to the client device further includes, providing (e.g., by credential management compute device 140), to the client device and in response to receiving the request for access to the secured resource, the stored credential format and/or protocol that enables the client device to register with or access the secured resource using the credential format and/or protocol issued before the request from the client device to access the secured resource.

Some implementations can include communicating (e.g., by credential management compute device 140) with multiple different services (e.g., service S1 and service S2) and/or multiple different compute devices (e.g., first service compute device 120 and second service compute device 130) to share credentials using the required and/or used credential formats and/or protocols for the particular user for each of the different services and/or compute devices without user action to initiate access to the multiple different services and/or compute devices (the multiple different services and/or compute devices using different credential formats and/or protocols.

Some implementations can include determining (e.g., by credential management compute device 140) that verification of the particular user for the first credential format and/or protocol or the second credential format and/or protocol expires within a predetermined threshold amount of time. Based on determining that identity verification of the particular user for the first credential format and/or protocol or the second credential format and/or protocol expires within the predetermined threshold amount of time, the credential format and/or protocol of the particular user for the first credential format and/or protocol or the second credential format and/or protocol can be automatically renewed (e.g., by credential management compute device 140).

Some implementations can further include determining (e.g., by credential management compute device 140) that the credential expiration of the particular user for a credential in the first credential format and/or protocol has ended (i.e., the credential in first credential format and/or protocol has expired). Based on determining that the credential of the particular user in the first credential format and/or protocol has expired, the credential in the second credential format and/or protocol can be deleted and/or marked as revoked, and the authenticated session of the particular user for the secured resource that was obtained using the second credential format and/or protocol can be automatically ended (including in conjunction with an identity access management system or authorization management system).

Some implementations can further include determining (e.g., by credential management compute device 140) that the credential of the particular user for the first credential format and/or protocol has been revoked. Based on determining that the credential of the particular user for the first credential format and/or protocol has been revoked, the credential in the second credential format and/or protocol can be deleted (e.g., by credential management compute device 140), and the authenticated session of the particular user for the secured resource that was obtained using the second credential format and/or protocol can be automatically ended (including in conjunction with an identity access management system or authorization management system). In some implementations, a credential management compute device can identify that the second credential was based on (e.g., transformed using) the first credential by the chain of trust, and cause any other credentials based on the first credential to be revoked.

Some implementations can further include determining (e.g., by credential management compute device 140) that the credential of the particular user for the first credential format and/or protocol has been updated. Based on determining that the credential of the particular user for the first credential format and/or protocol has been revoked, the credential in the second credential format and/or protocol can be updated (e.g., by credential management compute device 140), and the authenticated session of the particular user for the secured resource that was obtained using the second credential format and/or protocol can be automatically ended (e.g., by credential management compute device 140 (including in conjunction with an identity access management system or authorization management system).

Some implementations can further include receiving (e.g., by credential management compute device 140) a request from the client device to access the secured resource. In response to receiving the request from the client device to access the secured resource, a stored resource profile for the secured resource indicating credential format and/or protocol requirements and/or requests of the secured resource can be accessed (e.g., by credential management compute device 140). Attribute data for the particular user can be accessed. In some implementations, the attribute data describes attributes of the client device and a user account of the particular user. An identity verification request for the secured resource can be generated (e.g., by credential management compute device 140) by selecting attributes from the attribute data based on the stored resource profile. The generated identity verification request can be provided (e.g., by credential management compute device 140) to the secured resource (e.g., via first service compute device 120, via second service compute device 130).

Some implementations include associated systems, apparatus, and computer programs, configured to perform one or more techniques discussed herein, encoded on computer storage devices. A system of one or more computers can be so configured by virtue of software, firmware, hardware, or a combination of software, firmware and/or hardware installed on the system that in operation cause the system to perform the actions. One or more computer programs can be so configured by virtue having instructions that, when executed by data processing apparatus, cause the apparatus to perform the actions.

In some implementations, the actions performed by a user compute device (e.g., user compute device 110) can be executed by a processor (e.g., processor 111). In some implementations, the actions performed by a credential management compute device (e.g., credential management compute device 140) can be executed by a processor (e.g., processor 141). In some implementations, the actions performed by an access management compute device (e.g., access management compute device 150) can be executed by a processor (e.g., processor 151). In some implementations, the actions performed by a compute device associated with a service and/or resource (e.g., first service compute device 120, second service compute device 130) can be executed by a processor (e.g., processor 121, 131).

Figure 2:
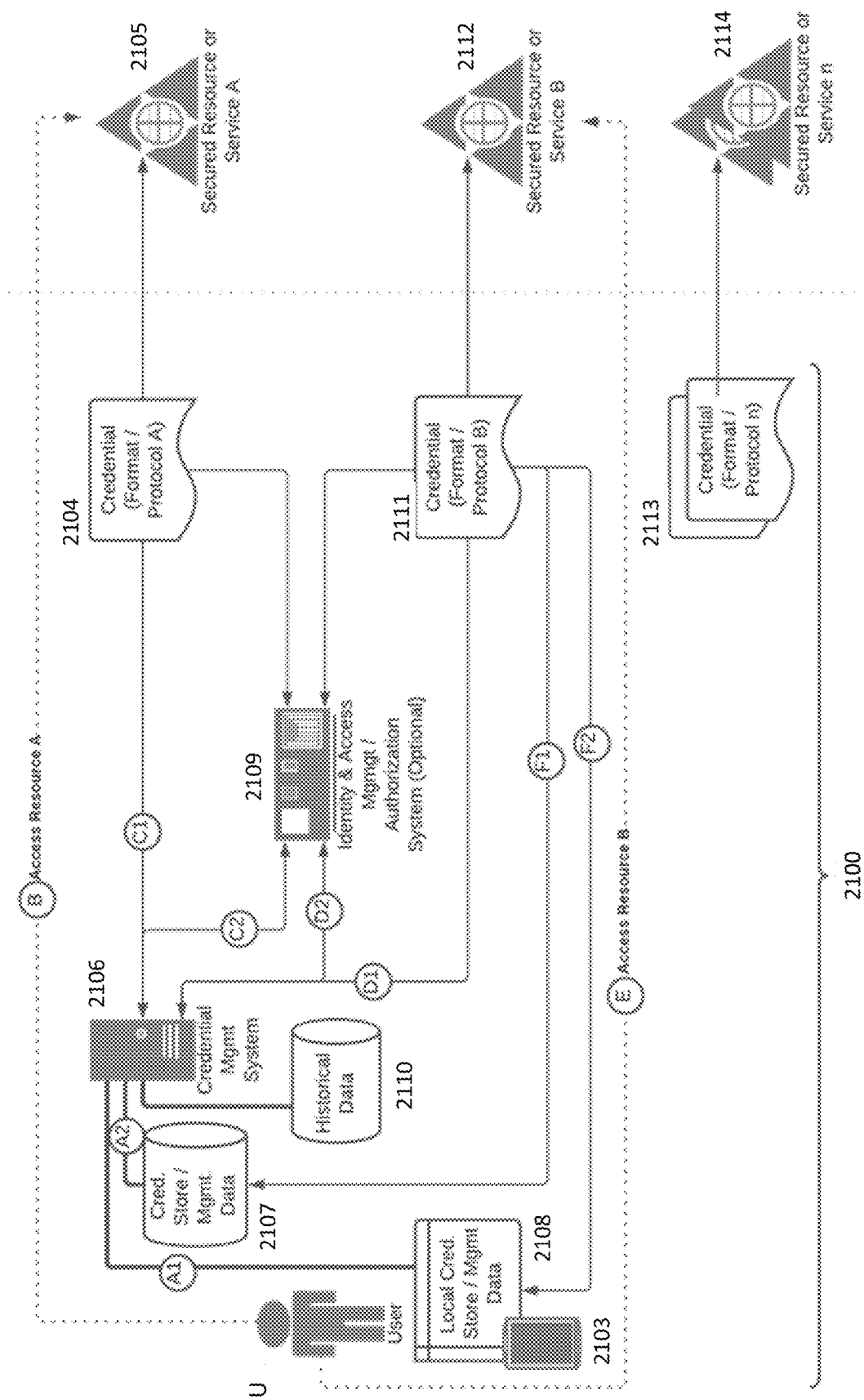
FIG. 2 shows a diagram illustrating a process for generating credentials for various services/resources, according to an embodiment.

FIG. 2 shows a diagram illustrating a process for generating credentials for various services/resources, according to an embodiment. User device 2103 (e.g., user compute device 110), credential management system 2106 (e.g., credential management compute device 140), credential storage 2107 (e.g., credential data 145), local credential storage 2108 (e.g., memory 113 and/or digital wallet 115), identity & access management system 2109 (e.g., access management compute device 150) and historical data store 2110 (e.g., historical data 147) in FIG. 2 can include data stores, any of which, depending on the particular implementation and configuration, may store identity and/or identity management data, attribute and/or attribute management data, privilege or authorization and/or privilege or authorization management data, policy and governance and/or policy and governance management data, process and/or process management data, credential and/or credential management data, metrics and metadata data and/or metrics and metadata management data, as well as other data and metadata associated with identity and credentialing.

In some implementations, secured resource A 2105 (e.g., first service compute device 120), secured resource B 2112 (e.g., second service compute device 130), and/or secured resource n 2114 (e.g., a service compute device not shown in FIG. 1) may also include data stores for a variety of data types and purpose.

In some implementations, credential management system 2106 may serve as a full-service identity management solution (including a variety of services and applications related to identity, credentialing and access management) in the case where identify & access management system 2109 is not present or available, and/or in the case where local credential storage 2108 is not present or available Policy and policy management for credential format/type and associated protocol(s) requirements and/or preferences may be stored and/or managed by secured resource A 2105, secured resource B 2112 and/or secured resource n 2114, and/or may be stored and/or managed by credential management system 2106 on behalf of secured resource A 2105, secured resource B 2112, and/or secured resource n 2114.

Logic and data associated with credential format and/or protocol transformation, conversion or translation and the support of, and switching to, associated protocol(s) can be contained within and managed by credential management system 2106 in some implementations. In some implementations, credential format and/or protocol transformation, conversion or translation and the support of, and switching to, the associated protocol(s) may occur within user device 2103.

In some implementations, governance controls and configurations, policies and policy data referenced for the purposes of credential format and/or protocol transformation, conversion or translation and the support of and switching to the associated protocol(s) can be contained within and managed by credential management system 2106. In some implementations, governance controls and configurations, policies and policy data referenced for the purposes of credential format and/or protocol transformation, conversion or translation and the support of and switching to the associated protocol(s) may occur within user device 2103.

An example scenario will be discussed with reference to FIG. 2. In this example scenario, a user wants to open a checking account at Acme Bank, where secured resource A 2105 is a compute device(s) associated with Acme Bank. The user also wants to open a saving account at BX Finance, where secured resource B 2112 is a compute device(s) associated with BX Finance.

Example Scenario Based on FIG. 2

A user U wants to open a checking account (B) with Acme Bank 2105 (e.g., first service S1 of FIG. 1) and open a savings account (E) with BX Finance 2112 (e.g., second service S2 of FIG. 1).

The user U already has a mobile driver's license issued by the government of Utopia in their local credential storage 2108 (e.g., digital wallet) stored on their mobile device 2103 (e.g., user compute device 110 of FIG. 1) that follows and supports the ISO 18013-5/-7 standard format and/or protocol.

The credential management system 2106 (e.g., credential management compute device 140 of FIG. 1) has (a) provided Acme Bank 2105 with a mechanism to document and store at credential storage 2107 their credential format and/or protocol 2104 requirements and policy within the credential management system 2106, and/or (b) read Acme Bank's credential format and/or protocol 2104 requirements and policy at the time of the transaction (e.g., via an API call or connector). This can include policies stored and managed within an Identity & Access Management System or Authorization System 2109.

Acme Bank 2105 supports the ISO 18013-5/-7 format and/or protocol standard, but requires and/or requests that the credential format and/or protocol 2104 presented have additional identity claims not indicated by the mobile driver license (e.g., social security number, employer, salary) verified and added to the ISO 18013-5/-7 payload by the credential management system 2106.

The credential management system 2106 sends an electronic signal to request consent from the user U to share and transform their mobile driver license credential that is stored in the local credential storage 2108 on their mobile device 2103. The user is also prompted to consent to store the transformed, resulting formatted credential 2104 either back into the local credential storage 2108 on their mobile device 2103 (F2) and/or store the formatted credential 2104 in the central data store or wallet 2107 within the central credential management system 2106 (F1) so the transformed credential 2104 can be used again in the future.

The user U confirms consent with the credential management system 2106. Thereafter, the credential management system 2106 verifies the mobile driver's license shared from the local credential storage 2108 (A1) to ensure that it is authentic (and, as needed, is still valid) using the ISO 18013-5/-7 standard protocol including verifying, using a public key, the digital signature of the government of Utopia used to sign (e.g., using a private key) the attributes requested by Acme Bank 2105 as defined in their credential format and/or protocol 2104 requirements and policy, and authenticating the user's identity (including, for example, using biometrics). The credential management system 2106 asserts the verification was completed successfully either by notifying Acme Bank 2105 or their designated identity & access management system 2109 (e.g., access management compute device 150 of FIG. 1), or by encapsulating the assertion inside the second credential format and/or protocol 2104 for when the credential is shared with Acme Bank 2105.

The credential management system 2106 uses specialized internal logic, rules, algorithms, tables of equivalencies, routines, machine learning, artificial intelligence, attribute mapping, etc. to transform the user's mobile driver license into a second credential based on the credential format and/or protocol 2104 requirements and policy that includes the requested attributes from the mobile driver license. In some implementations, the credential management system 2106 uses a machine learning model and/or artificial intelligence model (e.g., a neural network, a decision tree, a random forest, a Bayesian classifier, a reinforcement learning classifier and/or any other suitable AI and/or ML model) to transform a first credential to a second credential. In some instances, the AI and/or ML model is a neural network, and the neural network is trained using credentials in a first protocol as input learning data, and that credential in a second protocol as output learning data.

The credential management system 2106 causes the user compute device 2103 to request the user to provide or select from a list the additional identity claims (e.g., social security number, employer, salary, etc.) as defined in their credential format and/or protocol 2104 requirements and policy, and then verifies those claims with a third party authoritative system of record or by verifying another credential available in the local credential storage 2108 or credential storage 2107.

The credential management system 2106 inserts those verified identity attributes into the second credential 2104 and signs those attributes within the ISO 18013-5/-7 payload using either an internal private key or using an approved private key provided by the government of Utopia (e.g., as a certifier).

The credential management system 2106 then shares the ISO 18013-5/-7 formatted credential with required and/or requested attributes 2104 with Acme Bank 2105 (a) directly (C1), and/or (b) indirectly (C2) via the designated identity and access management system or authorization system 2109.

The credential management system 2106, based on consent, then stores the second transformed credential 2104 within (a) the credential storage 2107 within the credential management system 2106 (F1) and/or (b) the local credential storage 2108 on the user's mobile device 2103 (F2).

The credential management system 2106 stores the chain-of-trust (e.g., links and binding) between the mobile driver's license and the second credential 2104, along with metrics and metadata about the transaction, in the credential storage 2107 and/or historical data store 2110. The user is allowed to access the resource and proceed with their request to open a checking account at Acme Bank (B).

Next, the user U wants to open a savings account with BX Finance 2112. BX Finance 2112 has registered the credential format and/or protocol 2111 requirements and policy with the credential management system 2106. They require and/or request the same set of verified identity attributes as Acme Bank, however they support the W3C DIF standard format and/or protocol.

The credential management system 2106 requests consent from the user U to transform and share their mobile driver's license or their second credential (that was already transformed from their mobile driver's license, as discussed above with respect to Acme Bank) that is stored in the local credential storage 2108 on their mobile device 2103 and/or in the central data store 2107 in the credential management system 2106. The user is also prompted to consent to store the transformed, resulting formatted credential 2111 (third credential) either back into the user's wallet on their mobile device (F2) and/or store the third credential in the central data store or wallet 2107 within the central credential management system 2106 (F1) so the third credential can be used again in the future. The user U confirms consent with the credential management system 2106.

The credential management system 2106 first verifies either the mobile driver's license or the second credential (previously transformed for use with Acme Bank) shared from the local credential storage 2108 (A1) and/or shared from the credential storage 2107 in the credential management system 2106 (A2) to ensure that the mobile driver's license and/or the second credential is authentic (and, as needed, is still valid) using the ISO 18013-5/-7 standard protocol including verifying the digital signature of the government of Utopia (or other authoritative digital signature) used to sign the attributes required and/or requested by BX Finance 2112, using a public key paired to a private key used to generate the digital signature, as defined in their credential format and/or protocol 2111 requirements and policy, and authenticating the user's identity (including, for example, using biometrics).

The credential management system 2102 asserts the verification was completed successfully either by notifying BX Finance 2112 or their designated identity & access management system 2109, or by encapsulating the assertion inside the third credential format and/or protocol 2111 for when the credential is shared with BX Finance 2112.

The credential management system 2106 uses specialized internal logic, rules, algorithms, tables of equivalencies, routines, machine learning, artificial intelligence, etc. to transform the user's mobile driver license or their second credential (that was already transformed from their mobile driver license (see above for Acme Bank process)) into a third credential based on the credential format and/or protocol 2111 requirements and policy that includes the requested attributes, in this example using the W3C DIF reference standard.

The credential management system 2106 then shares the W3C DIF formatted credential with required and/or requested attributes 2111 with BX Finance 2112 (a) directly (D1), and/or (b) indirectly (D2) via the designated identity & access management system 2109.

The credential management system 2106, based on consent, then stores the third transformed credential 2111 within (a) the central data store 2107 within the credential management system 2106 (F1), and/or (b) the local credential storage 2108 on the user's mobile device 2103 (F2).

The credential management system 2106 stores the chain-of-trust (e.g., links and binding) between the mobile driver license or the second credential 2104 with the third credential 2111, along with metrics and metadata about the transaction, in the central management data store 2107 and/or historical data store 2110. The user is allowed to access the resource and proceed with their request to open a savings account at BX Finance (E).

The lifecycle management of the various credentials stored in the credential storage 2107 and/or in the local credential storage 2108 in the mobile device 2103 can occur within the credential management system 2106 and/or within the credential storage 2107 and changes stored in the historical data store 2110 can be used as an audit trail with tight bonding and linking back to the original root of trust.

Optionally, if the first credential (e.g., mobile driver's license) is revoked by the government of Utopia, the credential management system 2106 may, based on internal policies, risk of transaction types, user selection, and/or the like, review the chain of trust to identify credentials based on the first credential and automatically revoke the second credential and/or the third credential (and other derived credentials) and/or notify relying parties that leveraged the second and/or third credential within a certain timeframe prior to the date of revocation of the first credential.

In some implementations, the second and/or third credential may be revoked without the first credential (root of trust mobile driver license) having been revoked ahead of time.

If the service provider 2105 does not have the infrastructure to verify either the original digital credential or a transformed virtual credential, the credential management system 2106 can serve as the outsourced/proxy verifier for the service provider and deliver the data using a non-credential format/protocol.

Once the credential management system 2106 completes the verification process, the credential management system 2106 asserts the verification was completed successfully and repackages the attributes into a non-credential format/protocol.

The non-credential format/protocol accepted and supported by the particular service provider 2105 can be negotiated either in advance or in substantially real time between the credential management system 2106 and either the service provider 2105 or the service provider's designated identity & access management system 2109. Example formats/protocols may include secure authorization and authentication protocols (OAuth, SAML, OIDC, etc.), email message and attachment protocols (MQTT, MIME, PDF, etc.), directory and database synchronization protocols (OIDC, LDAP, SCIM, etc.), etc.

The credential management system 2106 can then share the formatted data with other attributes, as well as attestations and/or results of verification (and attestation and results of any other verification or risk assessment completed as an outsourced/proxy service), with the service provider 2105 directly (C1), and/or indirectly (C2) via the designated identity & access management system 2109. The user is allowed to access the resource and proceed with their request to open their checking account at Acme Bank 2105 (B).

Figure 3:
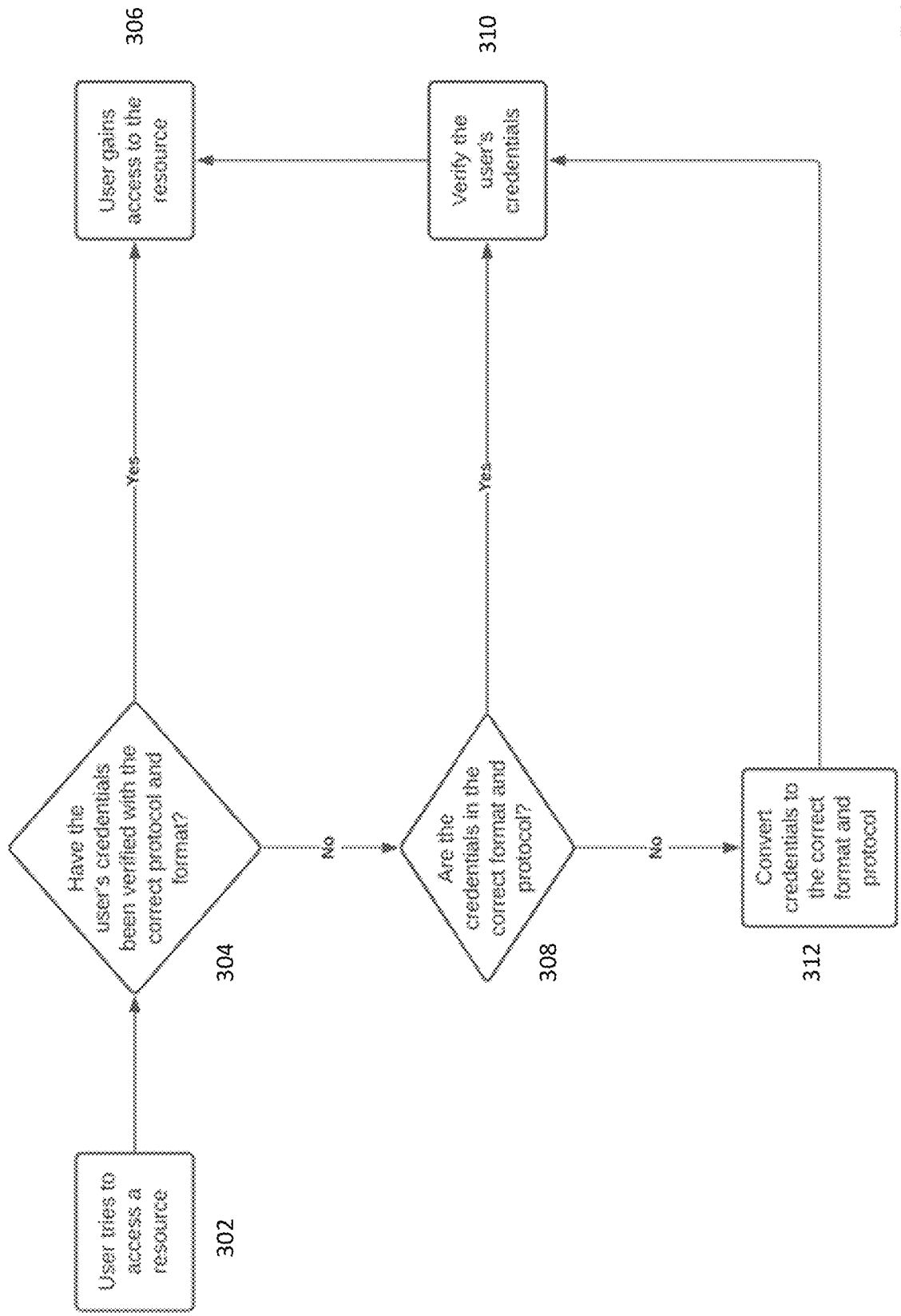
FIG. 3 shows a flow chart of a process to allow a user to gain access to an otherwise secure resource, according to an embodiment.

FIG. 3 shows a flowchart of a process to allow a user to gain access to an otherwise secure resource, according to an embodiment. At 302, a user (e.g., user U) tries to access a resource. For example, the user may use a compute device (e.g., user compute device 110) to cause a request to access the resource to be generated and sent (e.g., to credential management compute device 140, access management compute device 150, first service compute device 120, second service compute device 130, and/or the like). At 304, a determination is made whether the user's credentials have been verified with the correct (e.g., as requested and/or defined by a compute device, organization, and/or the like protecting access to the secured resource) protocol and/or format. The user's credentials can be mobile/electronic credentials in some implementations.

If 304 is determined to be yes, the user gains access to the resource at 306. For example, the compute device of the user can have access to a document, website, page, information, application, server, compute device, and/or the like associated with (e.g., hosting, facilitating, including, etc.) the resource at 306. If 304 is determined to be no, a determination is made at 308 if the credentials are in the correct format and/or protocol.

If 308 is determined to be yes, the user's credentials are verified at 310, and the user gains access to the resource thereafter at 306. If 308 is determined to be no, the credentials are converted to the correct format and/or protocol at 312, the user's credentials are verified thereafter at 310, and the user gains access to the resource thereafter at 306.

In some implementations, verification of an initial credential format using the associated protocol can be performed before transforming that initial credential into the correct credential format and usage of any associated protocol. In some implementations, the correct credential format may include all or a portion of the attributes and/or permissions (or authorizations) included in the initial credential either mandated and/or requested by the credential format and/or protocol requirements, mandated and/or requested by the particular associated protocol required and/or used by the secured resource, or mandated and/or requested by policy of the secure resource. In some implementations, the correct credential format may include additional verified claims (attributes) or privileges (authorizations) mandated, used and/or requested by the credential format, mandated, used and/or requested by the particular associated protocol required and/or used by the secured resource, or mandated, used and/or requested by policy of the secure resource. In some implementations, a particular protocol required and/or used by the secure resource may apply to more than one credential format mandated, used and/or requested by the credential format requirements, mandated, used and/or requested by the particular associated protocol required and/or used by the secured resource, or mandated, used and/or requested by policy of the secure resource.

Figure 4:
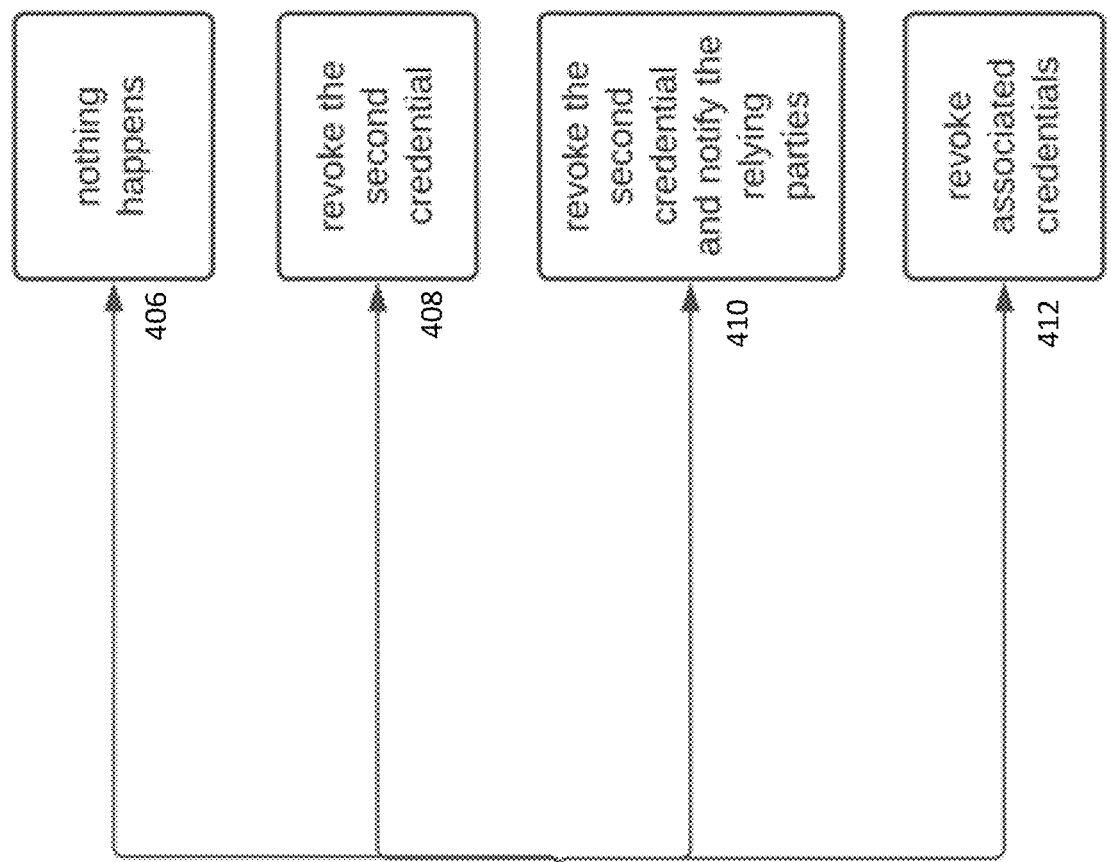
FIG. 4 shows a diagram illustrating what happens when an initial credential is revoked, according to an embodiment.

FIG. 4 shows a diagram illustrating what happens when an initial credential is revoked, according to an embodiment. At 402, an initial credential associated with (e.g., issued to, accessible by, etc.) a user is revoked. For example, the initial credential has expired, is no longer recognized as valid, has been deemed inappropriate for the user to have, been revoked by the associated and/or original issuer, and/or the like. The initial credential can be, for example, a first credential in a first format/protocol that was used to generate a second credential in a second format/protocol. In some implementations, the second credential can be identified as derived from the first credential based on a chain-of-trust associated with the first credential. At 404, a policy decision is made. In some implementations, the policy decision is to do nothing (e.g., to the second credential and/or associated credentials) at 406. For example, second credential generated based on the first credential is still valid, usable, not revoked, and/or the like. In some implementations, the policy decision at 404 results in revoking the second credential at 408. In some implementations, the policy decision at 404 results in revoking the second credential and notifying the relying parties (e.g., those parties giving access to a service or resource based on the second credential). In some implementations, the policy decision at 404 results in revoking associated credentials, such as the second credential and/or other credentials (e.g., other credentials of the user). In some implementations, revoking the second and/or associated credentials of the same user can be managed and revoked by the credential management system and/or it's governing administration or committee.

Figure 5:
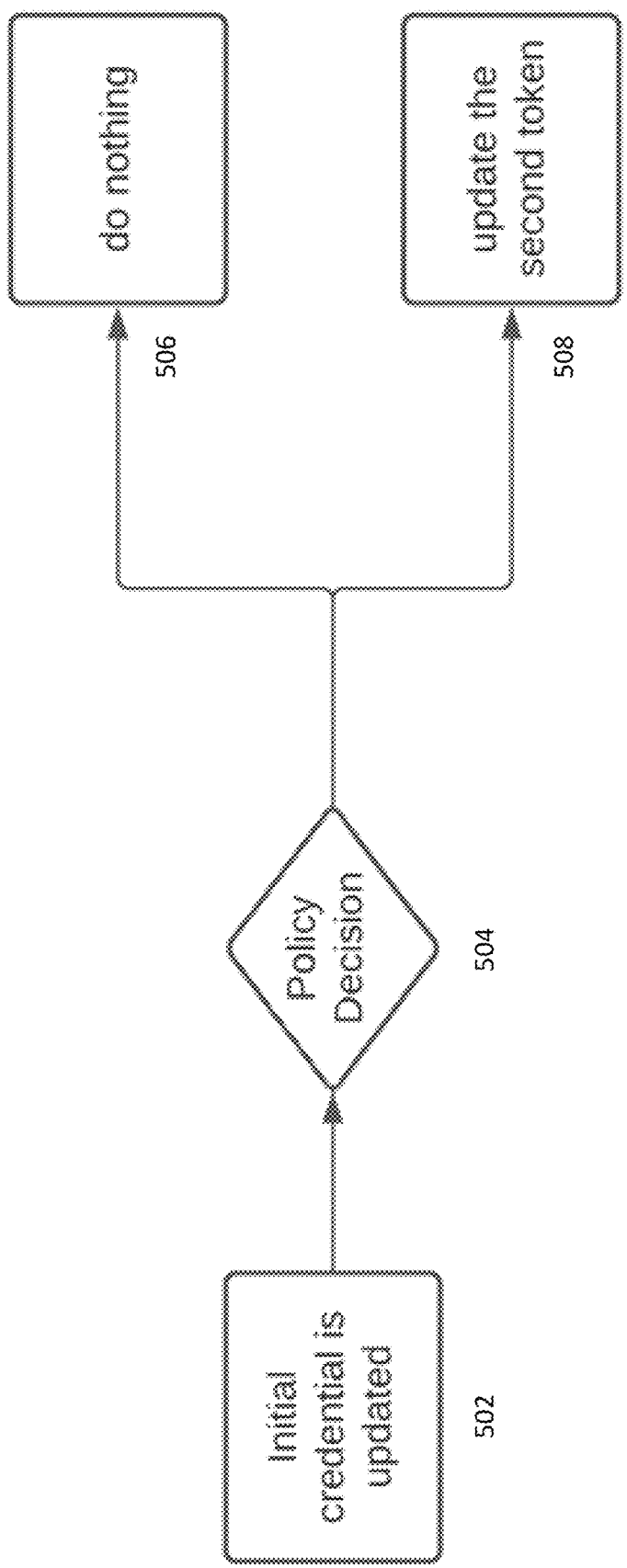
FIG. 5 shows a diagram illustrating what can happen when an initial credential is updated, according to an embodiment.

FIG. 5 shows a diagram illustrating what can happen when an initial credential is updated, according to an embodiment. At 502, an initial credential associated with (e.g., issued to) a user is updated. For example, information on the initial credential (e.g., age, address, expiration date, policy number, name, etc.) may have changed. The initial credential can be, for example, a first credential in a first format/protocol that was used to generate a second credential in a second format/protocol. In some implementations, the second credential can be identified as derived from the first credential based on a chain-of-trust associated with the first credential. At 504, a policy decision is made. In some implementations, the policy decision is to do nothing at 506. For example, information for the second credential generated based on the first credential is not updated (even if that information has been updated at the first credential). In some implementations, the policy decision at 504 results in updating the second credential. For example, the information that has been updated at 502 can also update at the second credential, at 508. If, for example, the policy number of the initial credential has changed, the policy number of the second credential can also change.

In some implementations of the methods discussed with respect to FIG. 4 and FIG. 5, the policy decision may be influenced by or determined by one or more of the following which can be inputs or controls managed and affected directly by or within the credential management system, or inputs or controls managed by other affiliated or companion computing services, systems, devices or networks: governing law, government directives or policy, judicial court order of the specific jurisdiction in which the credential management system is operating and/or specific jurisdiction where the user resides or is a citizen; the governing administration or committee of the credential management system; the governing set of policies and procedures of the credential management system; an adjudicator or investigator of the governing administration or committee of the credential management system or a designated second or third party authorized by the governing administration of the credential management system; a machine learning (ML) or artificial intelligence (AI) model of the credential management system based on one or more internal or external inputs; the user's past, present and/or future planned behavior (when interacting in the digital reality and/or physical reality); the user's past, present and/or future planned geographic location (when interacting in the digital reality and/or physical reality); the past, present and/or future planned device or compute device used by the user (including the type, version and build of the operating system and any other software installed on the device); the past, present and/or future planned secure resources used by the user; the internal and/or external security posture and/or threat conditions in which the credential management system is operating; the level of risk associated with the particular transaction; the level of risk assigned to the user; the level of risk assigned to the device or devices used by the user; the amount or level of identity verification (identity proofing) completed for the given user; other specific internal or external signals or warnings related to the user; other specific internal or external signals or warnings related to the device that has been, is being or will be used by the user; the format of the credential and the particular associated protocol(s); the category or type of the credential; the organization or association governing the format and/or protocols of the credential; the degree of affiliation of the particular credential to one or more secured resources (e.g., if it is used for a single, or single type of, or a small number of secured resources); the time-to-live or expiration date of the credential; the issuance date of the credential; the date the last time the credential has been renewed or reactivated; the amount of time that passed between the date the credential last suspended or expired and the date the credential was renewed or reactivated; the date the last time the attributes and/or privileges contained in the credential have been updated; the date the last time the attributes and/or privileges contained in the credential have been verified; how often the credential has been, is, or is planned to be used by the user; the specific attributes and privileges, type of attributes and privileges, and/or number of attributes and privileges contained within the credential; how often the credential has been successfully verified when the credential has been presented for use; whether or how many times the credential, or the previous credential the credential replaced, has been compromised; an input or control (e.g., configuration or setting) managed by the user, one or more designated proxy (e.g. spouse, parent or guardian, power of attorney holder, etc.), or their employer; an act of consent (digital, remote, in-person, written, etc.) obtained from the user, one or more designated proxy (e.g., spouse, parent or guardian, power of attorney holder, etc.), or their employer; any other factors or signals, internal or external, related to policy and directives, the user, the user's environment and method of interaction, the credential, the credential format and/or protocol, the secure resource(s), affiliated or companion computing services, systems, devices or networks, the governing administration or designated second or third party, and/or the governing laws and jurisdiction.

As one example, attribute-by-attribute mappings and conversions of an ISO 18013-5 mobile driver license into a DIF/W3C Verifiable Credential appear in Table 1 below to illustrate how a credential format and/or protocol transformation can be completed by the credential management system, according to one embodiment. The credential management system may support other format and/or protocol standards (such as the SMART healthcare format and/or protocol), as well as proprietary credential formats and protocols.

TABLE 1

| Type | ISO 18013-5/-7 | DIF/W3C | Comments / Transforms |
|---|---|---|---|
| Transport | NFC, BLE, Wi-Fi Aware | All available | |
| Transport Protocol | Device Retrieval/ Server Retrieval | SIOP/ OIDC4VP | In case of Server Retrieval the CMS can use the token issued by the device to request the mDL from the server |
| Transport Encryption | Session Encryption | TLS | |
| Request/ Response Encoding | CBOR | JWT | |
| Response/ Response Formatting | CBOR | JWS | |
| Container | mDL | Verifiable Presentation | |
| Security Object | MSO | JWS | The MSO is signed by the issuing authority. The JWS will be signed by the CMS |
| Data Object | mDoc | Verifiable Credential | Field mappings between mDoc and VC can maintain the field names. The format changes are in the security object and the transport |
| Verification Revocation | CBOR Header Time-based expiry | DID Identity Hub/ StatusList | |

Figure 6:
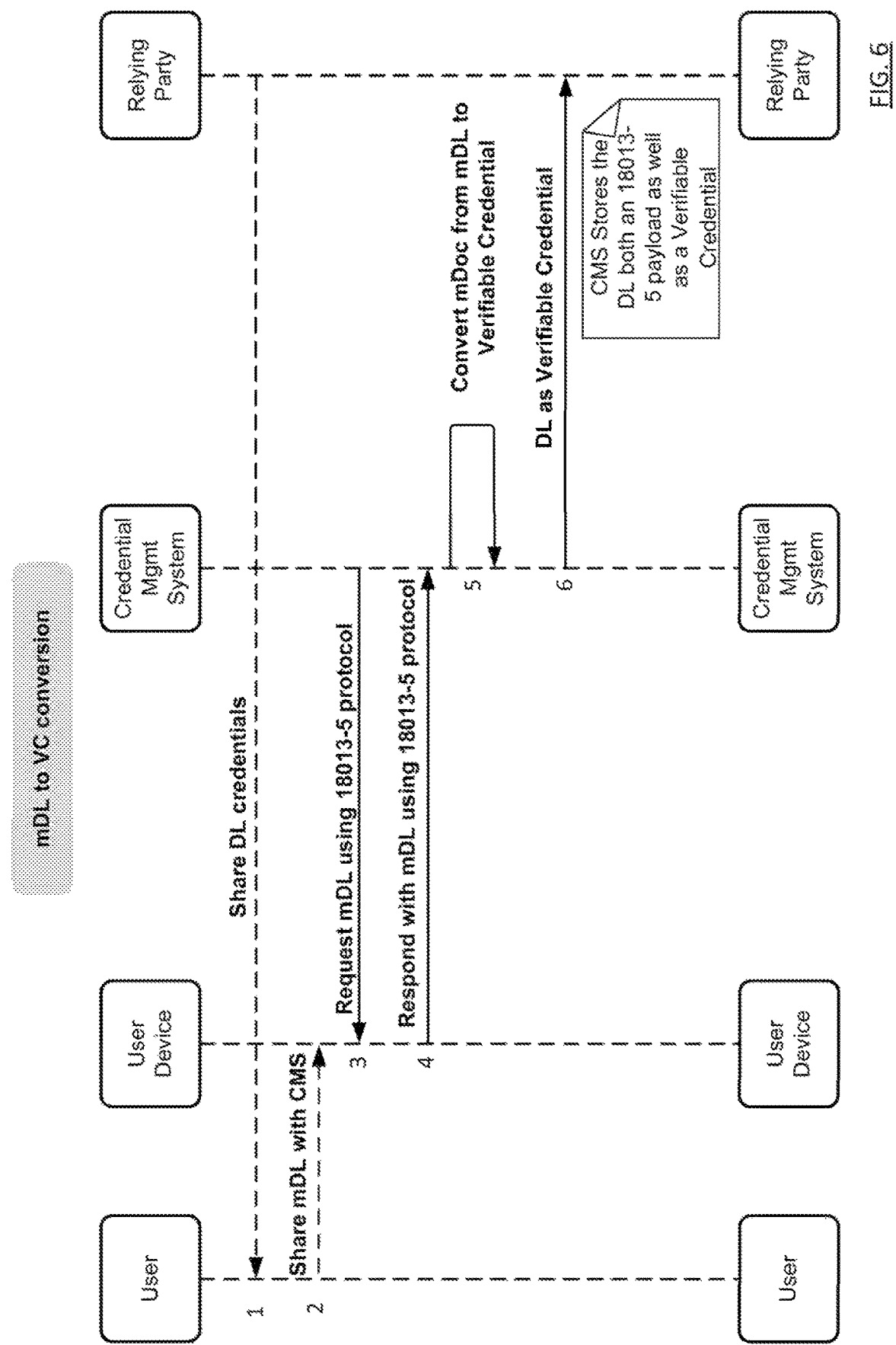
FIG. 6 shows a diagram illustrating conversion from a mobile driver license (mDL) to a verifiable credential (VC), according to an embodiment.

FIG. 6 shows a diagram illustrating conversion from a mobile driver's license (mDL) to a verifiable credential (VC), according to an embodiment. At step 1, the relying party requests driver license credentials of a user. The user provides their mobile driver license with their user device at step 2. The credential management system requests the mobile driver license using 18013-5 protocol at step 3. The user device shares the mobile driver license using 18013-5 with the credential management system at step 4. The relying party may not be able to use and/or prefer not to use mobile driver license in 18013-5 protocol. Therefore, the credential management converts the mobile driver's license to a verifiable credential at step 5. The verifiable credential can be in a format of a protocol that the relying party uses, requires, requests, and/or prefers. In some implementations, the credential management system stores the mobile driver's license and/or verifiable credential at step 6 (e.g., to reuse in the future, to update as needed, and/or the like). In some implementations, a credential different than a mobile driver's license can be used. In some implementations, a protocol different than 18013-5 can be used.

Figure 7:
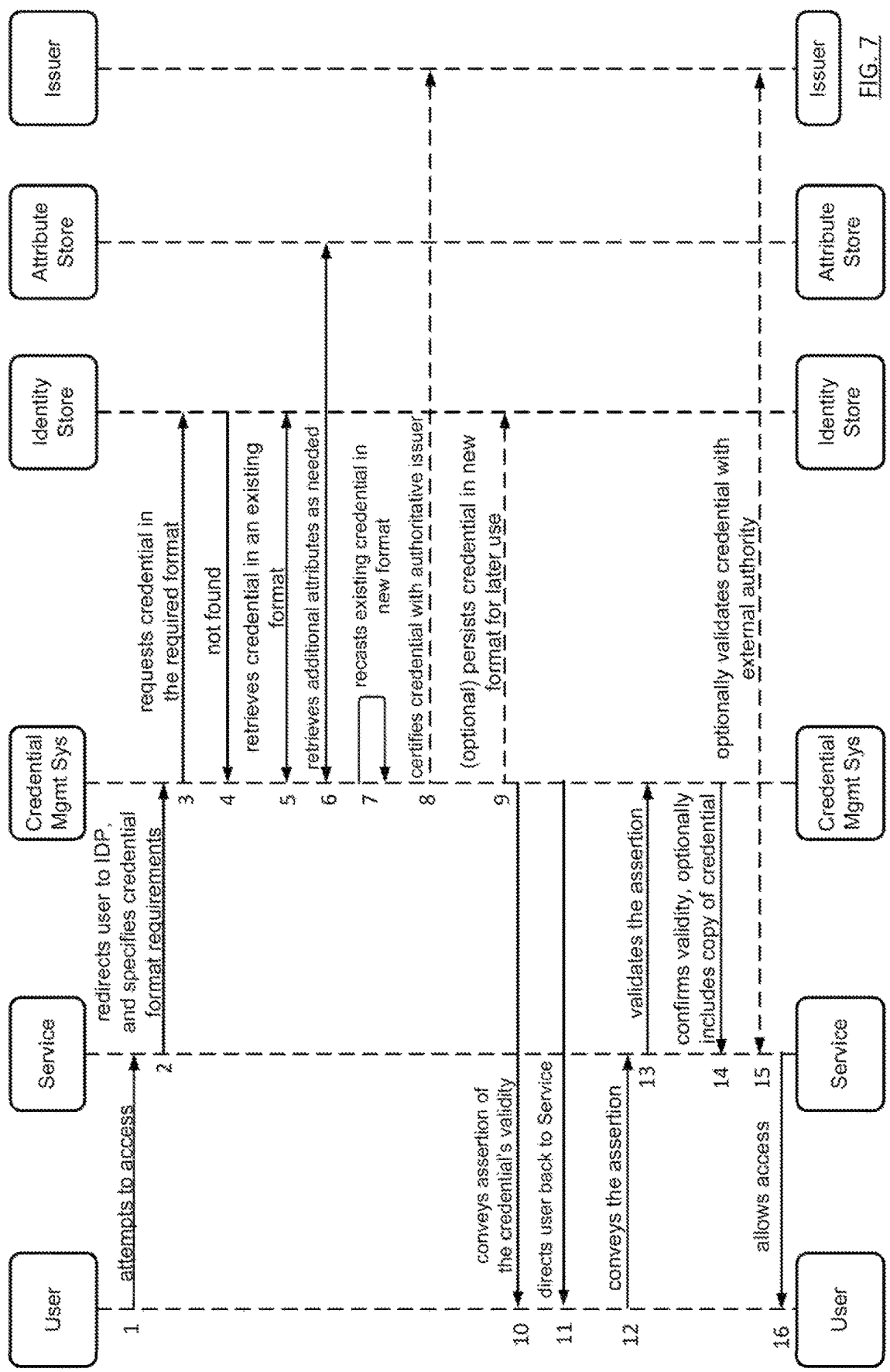
FIG. 7 shows a diagram illustrating a process of granting a user access to a service using an identity store and attribute store, according to an embodiment.

FIG. 7 shows a diagram illustrating a process of granting a user access to a service using an identity store and attribute store, according to an embodiment. At step 1, a user attempts to access a service (e.g., at first service compute device 120, at second service compute device 130, and/or the like) using a user device (e.g., using user computer device 110). At step 2, the service redirects the user's user device to a credential management system (e.g., credential management compute device 140), and specifies the format requirements and/or preferences for a credential. The credential management system requests the credential in the required and/or preferred format and/or protocol from an identity store (e.g., local credential storage 2108, credential storage 2107) at step 3. The identity store responds indicating that the requested credential in the required and/or preferred format and/or protocol is not found at step 4. At step 5, the credential management system and/or identity store retrieves the credential in an existing format and/or protocol, the existing format and/or protocol not being the required and/or preferred format and/or protocol of the service. At step 6, the credential management system receives and/or retrieves additional attributes from an attribute store. The credential management system recasts and/or transforms the credential in the existing format and/or protocol into a new format and/or protocol at step 7. The credential management system then causes the credential in the new format and/or protocol to be certified with the issuer of the credential (e.g., U.S. government, state government, etc.) at step 8. At step 9, the credential management system persists and/or stores the credential in the new format and/or protocol in the identity store for later use. At step 10, the credential management system conveys assertion of the credential's validity, and directs the user/user's device back to the service. The user device conveys the assertion to the service at step 12, and the service validates the assertion with the credential management system at step 13. The credential management system confirms validity and, optionally, includes a copy of the credential to the service at step 14. The service can optionally validate the credential with the issuer as well at step 15. The service allows the user access to the service at step 16.

FIG. 8 shows a diagram illustrating a process of granting a user compute device access to a service by transforming a credential, according to an embodiment. At step 1, a user attempts to access a service using a wallet (e.g., digital wallet 115) of their user compute device. The wallet may include credentials in a first protocol. At step 2, the service (e.g., first service compute device 120, second service compute device 130, and/or the like) specifies credential format and/or protocol requirements. At step 3, a determination is made (e.g., by user compute device 110) that the wallet does not include and/or have access to the credential in the requested format and/or protocol. At step 4, the user uses their user compute device to provide an existing credential to a credential management system (e.g., credential management system 140) and request conversion of the credential to the format and/or protocol requested by the service. At step 5, the credential management system requests and retrieves additional attributes from the user compute device (e.g., social security number, employer, salary, etc.) as used by the requested format and/or protocol. At step 6, the credential management system and attribute store correspond to provide the credential management system any additional attributes as used by the requested format and/or protocol. At step 7, the credential management system recasts and/or transforms the existing credential received at step 4 into the requested, new format and/or protocol. At step 8, the credential management system requests certification of the new credential to the issuer of the credential (e.g., U.S. government, state government, etc.). At step 9, the issuer asserts that the new credential in the new format and/or protocol is valid (e.g., by digitally signing the credential in the new format and/or protocol with a private key of the issuer). At step 10, the credential management system conveys the new credential in the new format and/or protocol to the user compute device/user wallet. At step 11, the new credential is stored (e.g., at the user wallet) for later reuse. At step 12, the user compute device conveys the new credential to the service. At step 13, the service optionally can verify the certification with issuer (e.g., verify authenticity of the digital signature using a public key of the issuer). At step 14, the service allows the user compute device access to the service based on the new credential.

FIG. 9 shows a flowchart of a method 900 for transforming a virtual credential, according to an embodiment. In some implementations, method 900 can be performed by the processor of a credential management compute device (e.g., processor 141 of credential management compute device 140).

At 902, receive, by a processor (e.g., processor 141) and from a user device (e.g., user compute device 110) associated with a user (e.g., user U), a request to access a service associated with a first protocol (e.g., format/protocol 125, format/protocol 135). In some implementations, the request can be for any type of request that is offered by a service provider. For example, the request can be for purchasing an item, opening an account, accessing an account, etc.

At 904, receive, by the processor, a virtual credential of the user authorized by an authorizing entity. The virtual credential compliant with a second protocol different than the first protocol. The virtual credential can be any type of credential that the service associated with the first protocol introduced at step 902 uses, requires and/or verifies prior to granting the user access to that service, and/or for the user to share their verified attribute data to complete a form or to register in the user's new or existing account. In some implementations, for example, the virtual credential is a mobile driver's license issued by a government. In some implementations, for example, the virtual credential is an ID issued by a government, school, or organization.

At 906, verify, by the processor, that the virtual credential is authorized by the authorizing entity. In some implementations, step 906 can include analyzing the virtual credential for a predetermined icon, seal, signing key, or digital signature. In some implementations, a signal can be sent to the service provider providing the requested service indicating that the virtual credential is authorized in response to the verifying at 206. Alternatively or additionally, an indication that the virtual credential is authorized can be encapsulated within the representation of the transformed virtual credential sent at 910.

At 908, transform, by the processor, the virtual credential to generate a transformed virtual credential compliant with the first protocol. In some implementations, logic, rules, algorithms, tables of equivalencies, routines, machine learning, artificial intelligence, or a combination thereof can be used to generate the transformed virtual credential. For example, one or more machine learning models (e.g., ML model(s) 149) can be trained using training data including virtual credentials compliant with the first protocol (e.g., as target training data) and second protocol (e.g., as input training data).

At 910, send, by the processor, a representation of the transformed virtual credential to the service. In some implementations, because the representation of the transformed virtual credential is in a format/protocol desired by the service, the method can further cause a compute device associated with the service to automatically initiate the service requested by the user via their user device.

At 912, verify, by the processor and after the sending at 910, that the transformed virtual credential is valid. For example, the transformed virtual credential can be checked to ensure that the transformed virtual credential is not expired, has not been revoked, and/or the like.

In some implementations of method 900, the first and/or second format/protocol can be any format/protocol for implementing a credential (e.g., driver's license, ID, etc.) with a compute device such as, for example, a mobile device (e.g. smartphone, tablet, smartwatch). In some implementations, the first format/protocol and/or second format/protocol can be, for example, at least one of ISO 18013, ISO 23220 (Workgroup 4) and/or family, W3C Verifiable Credentials and/or family, Decentralized Identity Foundation (DIF) and/or family, Hyperledger Indy and/or family, The Commons Project SMART and/or family, OpenID Foundation OpenID Connect (OIDC) and/or family, electronic IDentification, Authentication and trust Services (eIDAS) and/or family, International Civil Aviation Organization (ICAO) Digital Travel Credential (DTC), etc. In some implementations, a family refers to a series of protocols. A family associated with a protocol can mean that the family includes the protocol. In some implementations, a family is a collection of standards that interrelate and/or are dependent on one another. For example, digital credential standards listed under ISO 23220 and ISO 18013 may be under one family. As another example, in the case of W2C, DIF and DID may comprise the same family.

Some implementations of method 900 further include determining, after verifying that the transformed virtual credential is valid, that the virtual credential is not valid. Some implementations of method 900 further include sending, in response to the determining, a signal to cause the transformed virtual credential to be revoked. Some implementations of method 900 further include verifying, prior to the transforming at 908, that the virtual credential is not expired.

Figure 10:
FIG. 10 shows a flowchart of a method of sending a transformed virtual credential and at least one additional attribute about a user to a service, according to an embodiment.

FIG. 10 shows a flowchart of a method 1000 of sending a transformed virtual credential and at least one additional attribute about a user to a service, according to an embodiment. In some implementations, method 1000 can be performed by the processor of a credential management compute device (e.g., processor 141 of credential management compute device 140).

At 1002, receive, from a user device (e.g., user compute device 110) associated with a user (e.g., user U), a request to access a service associated with a first protocol (e.g., format/protocol 125, format/protocol 135). In some implementations, the request can be for any type of request that is offered by a service provider. For example, the request can be for purchasing an item or opening an account.

At 1004, receive a virtual credential of the user authorized by an authorizing entity. The virtual credential is compliant with a second protocol different than the first protocol. The virtual credential can be any type of credential that the service associated with the first protocol introduced at step 1002 uses, requires and/or verifies prior to granting the user access to that service. In some implementations, the second protocol supports the first protocol, but uses additional information beyond the information included in the virtual credential, uses one or more attributes deemed incorrect, uses one or more attributes that are no longer valid and must be removed or changed (e.g., including new private key signature on any changed attributes), uses different mechanisms or methods to transmit the virtual credential over the network 160, uses different mechanisms or methods for verifying the virtual credential, uses different criteria or thresholds for verification of the virtual credential to be successful, uses different masking or removal of attributes/information to meet different privacy requirements or user choice, uses different security mechanisms or strengths and/or different recognized issuers, wallet providers, networks, or verifiers, or any combination thereof. The first protocol supporting the second protocol can refer to the first protocol recognizing (e.g., being able to decipher) the second protocol, but requiring and/or requesting additional information, methods, procedures, thresholds, rules, security, privacy, communications, etc. in the second format/protocol for a credential to be in the first format/protocol.

At 1006, verify that the virtual credential is authorized by the authorizing entity. In some implementations, step 1006 can include analyzing the virtual credential for a predetermined icon, seal, signing key, or digital signature. In some implementations, in response to the verifying at 1006, a signal can be sent to the service provider providing the requested service that indicates the virtual credential is authorized. Alternatively or additionally, an indication that the virtual credential is authorized can be encapsulated within the representation of the transformed virtual credential sent at 1016.

At 1008, receive a representation of at least one attribute associated with the user and used by the first protocol but not indicated by the virtual credential. In some implementations, the at least one attribute can be received from the user device, automatically and/or after receiving consent from the user. The at least one attribute can be any attribute associated with the user, such as, but not limited to, name, age, address, height, weight, ethnicity, unique identifier, date of birth, social security number, salary, employer, education, and/or the like.

At 1010, verify that the at least one attribute is valid. In some implementations, the at least one attribute can be verified by checking one or more databases that can serve to corroborate the at least one attribute received at 1008. In some implementations, 1010 is optional, in which case 1008 can proceed to 1012 or 1014.

At 1012, sign the at least one attribute with a private key to generate at least one signed attribute. In some implementations, the private key is an internal private key associated with a credential management compute device (e.g., credential management compute device 140). In some implementations, the private key is an approved private key provided by an authorized entity (e.g., government that issued the virtual credential).

At 1014, transform the virtual credential to generate a transformed virtual credential compliant with the first protocol. In some implementations, logic, rules, algorithms, tables of equivalencies, routines, machine learning, artificial intelligence, or a combination thereof can be used to generate the transformed virtual credential. For example, one or more machine learning models (e.g., ML model(s) 149) can be trained using training data including virtual credentials having the first format/protocol (e.g., as target training data) and second format/protocol (e.g., as input training data).

At 1016, send the transformed virtual credential and the at least one signed attribute to the service. In some implementations, the processor can add the at least one signed attribute to the transformed virtual credential payload for sending to the service. In some implementations, step 1016 can further include causing a compute device associated with the service (e.g., first service compute device 120, second service compute deice 130) to automatically initiate the service requested by the user via their user device.

In some implementations of method 1000, the virtual credential is at least one of a mobile driver's license, a mobile passport, a mobile national identification (ID), a mobile state ID, or a mobile provincial ID, and the authorizing entity is a government associated with the at least one of the mobile driver's license, the mobile passport, the mobile national ID, the mobile state ID, or the mobile provincial ID.

In some implementations of method 1000, the first protocol and/or the second protocol is at least one of W3C Verifiable Credentials, a family associated with the W3C Verifiable Credentials, ISO 18013, ISO 23220, a family associated with the ISO 18013, a family associated with the ISO 23220, W3C Decentralized Identifiers (DIDs), a family associated with the W3C DIDs, International Civil Aviation Organization (ICAO) Digital Travel Credential (DTC), a family associated with ICAO DTC, The Commons Project SMART, a family associated with The Commons Project SMART, Decentralized Identity Foundation (DIF), a family associated with the DIF, OpenID Foundation OpenID Connect, a family associated with the OpenID Foundation OpenID Connect, Hyperledger Indy, or a family associated with the Hyperledger Indy.

Some implementations of method 1000 further include determining that the virtual credential is not valid. Some implementations of method 1000 further include sending, in response to determining that the virtual credential is not valid, a signal to cause the transformed virtual credential to be revoked.

In some implementations of method 1000, the request is a first request, the service is a first service, and the transformed virtual credential is generated at a first time. Some implementations of method 1000 further include receiving, at a second time after the first time, a second request to access a second service that is different than the first service and associated with the first protocol. Some implementations of method 1000 further include sending, after receiving the second request, the transformed virtual credential to the second service.

FIG. 11 shows a flowchart of a method 1100 of predicting that a user is going to request a secured resource, according to an embodiment. In some implementations, method 1100 can be performed by the processor of a credential management compute device (e.g., processor 141 of credential management compute device 140). The method includes, at 1102, receive, via a first compute device (e.g., credential management compute device 140), a first set of data indicating a context of a second compute device (e.g., user compute device 110) associated with a user (e.g., user U). In some implementations, the context includes at least one of a time, an application running on the second compute device, an attribute associated with the user, or a location associated with the user.

At 1104, receive, via the first compute device, a virtual credential associated with the user and that complies with a second protocol different than a first protocol. At 1106, predict, via the first compute device, that the user is going to request access to a secured resource based on the first set of data and a second set of data indicating at least one previous resource access associated with at least one of the user or another user. At 1108, determine, via the first compute device and in response to predicting that the user is going to request access to the secured resource at 406, that access to the secured resource involves verification using the first protocol. At 1110, transform, via the first compute device and in response to predicting that the user is going to request access to the secured resource at 406, the virtual credential to generate a transformed virtual credential compliant with the first protocol. At 1112, receive, via the first compute device, from the second compute device, after transforming the virtual credential to generate the transformed virtual credential at 1110, and after predicting that the user is going to request access to the secured resource at 1106, a request to access the secured resource.

In some implementations of method 1100, the virtual credential is at least one of a mobile driver's license, a mobile passport, a mobile national identification (ID), a mobile state ID, or a mobile provincial ID, and the authorizing entity is a government associated with the at least one of the mobile driver's license, the mobile passport, the mobile national ID, the mobile state ID, or the mobile provincial ID.

In some implementations of method 1100, the first protocol and/or the second protocol is at least one of W3C Verifiable Credentials, a family associated with the W3C Verifiable Credentials, ISO 18013, ISO 23220, a family associated with the ISO 18013, a family associated with the ISO 23220, W3C Decentralized Identifiers (DIDs), a family associated with the W3C DIDs, International Civil Aviation Organization (ICAO) Digital Travel Credential (DTC), or a family associated with ICAO DTC.

Some implementations of method 1100 further include storing, in response to predicting that the user is going to request access to the secured resource and prior to receiving the request to access the secured resource, a representation of the transformed virtual credential. Some implementations of method 1100 further include sending, in response to predicting that the user is going to request access to the secured resource and prior to receiving the request to access the secured resource, the transformed virtual credential to a compute device associated with the secured resource.

In some implementations, methods 900, 1000, and/or 1100 can include repeatedly (e.g., periodically, continuously, or sporadically) verifying, after having been sent, that the virtual credential is valid and/or not expired. For example, if the virtual credential included an expiration date, that expiration date can be compared to a current date. As another example, a database that stores information indicating whether the authorizing entity has revoked the virtual credential can be checked. If it is determined that the virtual credential is no longer valid (e.g., has been revoked) and/or expired, the transformed virtual credential can also be invalidated (e.g., immediately, after a predetermined period of time).

In some implementations, methods 900, 1000, and/or 1100 can further include storing the data that was sent to the service at 910, 1016, and/or 1110 for future reuse. For example, the user may request a different service that uses the first format/protocol, in which case the stored data (e.g., signed at least one attribute, transformed virtual credential) can be resent (e.g., after consent by the user, automatically without requiring further human input).

In some implementations, methods 900, 1000, and/or 1100 can further include the transformation of the transformed virtual credential and/or at least one signed data attribute into non-credential standards and/or protocols, including to support backwards compatibility with existing/legacy infrastructures and ecosystems and/or to accommodate existing business processes. For example, after the original digital credential or virtual credential is verified by credential management compute device 140 using associated methods and protocols, data attributes (including any imagery or documents) approved by the identity owner and shared for the transaction, verification results and any attestations of verification, and/or any relevant metrics and metadata, can be repackaged by a service at, for example, access management compute device 150 into a format and transmitted to first service compute device 120 and/or second service compute device 130 using an associated protocol accepted and supported by the particular service provider (or the service provider's designated identity and access management system), such as secure authorization and authentication protocols (e.g., OAuth, SAML, OIDC, etc.), email message and attachment protocols (MQTT, MIME, PDF, etc.), directory and database synchronization protocols (OIDC, LDAP, SCIM, etc.), etc.

In one scenario, performing methods 900, 1000, and/or 1100 can allow a user to access the service that they otherwise could not have accessed, or can allow the user to access the service much faster than they otherwise could have. For example, if method 900, 1000, and/or 1100 was not performed, a user may be required to travel in person to a service provider to verify attributes about the user required by the service provider.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:
    receiving, by a processor and from a user device associated with a user, a request to access a service associated with a first protocol;
    receiving, by the processor, a virtual credential of the user authorized by an authorizing entity, the virtual credential compliant with a second protocol different than the first protocol;
    verifying, by the processor, that the virtual credential is authorized by the authorizing entity;
    transforming, by the processor, the virtual credential to generate a transformed virtual credential compliant with the first protocol;
    sending, by the processor, a representation of the transformed virtual credential to the service; and
    verifying, by the processor and after the sending, that the transformed virtual credential is valid.

2. The method of claim 1, further comprising:
    determining, by the processor and after verifying that the transformed virtual credential is valid, that the virtual credential is not valid; and
    sending, by the processor and in response to the determining, a signal to cause the transformed virtual credential to be revoked.

3. The method of claim 1, wherein the virtual credential is at least one of a mobile driver's license, a mobile passport, a mobile national identification (ID), a mobile state ID, or a mobile provincial ID, and the authorizing entity is a government associated with the at least one of the mobile driver's license, the mobile passport, the mobile national ID, the mobile state ID, or the mobile provincial ID.

4. The method of claim 1, wherein at least one of the first protocol or the second protocol is at least one of W3C Verifiable Credentials or a family associated with the W3C Verifiable Credentials.

5. The method of claim 1, wherein at least one of the first protocol or the second protocol is at least one of ISO 18013, ISO 23220, a family associated with the ISO 18013, or a family associated with the ISO 23220.

6. The method of claim 1, wherein at least one of the first protocol or the second protocol is at least one of W3C Decentralized Identifiers (DIDs) or a family associated with the W3C DIDs.

7. The method of claim 1, wherein at least one of the first protocol or the second protocol is at least one of International Civil Aviation Organization (ICAO) Digital Travel Credential (DTC) or a family associated with the ICAO DTC.

8. The method of claim 1, wherein at least one of the first protocol or the second protocol is at least one of The Commons Project SMART, a family associated with The Commons Project SMART, Decentralized Identity Foundation (DIF), a family associated with the DIF, OpenID Foundation OpenID Connect, a family associated with the OpenID Foundation OpenID Connect, Hyperledger Indy, or a family associated with the Hyperledger Indy.

9. The method of claim 1, further comprising:
verifying, prior to the transforming, that the virtual credential is not expired.

10. An apparatus, comprising:
a memory; and
a processor operatively coupled to the memory, the processor configured to:
receive, from a user device associated with a user, a request to access a service associated with a first protocol;
receive a virtual credential of the user authorized by an authorizing entity, the virtual credential compliant with a second protocol different than the first protocol;
verify that the virtual credential is authorized by the authorizing entity;
receive a representation of at least one attribute associated with the user and used by the first protocol but not included in the virtual credential;
verify that the at least one attribute is valid;
sign the at least one attribute with a private key to generate at least one signed attribute;
transform the virtual credential to generate a transformed virtual credential compliant with the first protocol; and
send the transformed virtual credential and the at least one signed attribute to the service.

11. The apparatus of claim 10, wherein the virtual credential is at least one of a mobile driver's license, a mobile passport, a mobile national identification (ID), a mobile state ID, or a mobile provincial ID, and the authorizing entity is a government associated with the at least one of the mobile driver's license, the mobile passport, the mobile national ID, the mobile state ID, or the mobile provincial ID.

12. The apparatus of claim 10, wherein at least one of the first protocol or the second protocol is at least one of W3C Verifiable Credentials, a family associated with the W3C Verifiable Credentials, ISO 18013, ISO 23220, a family associated with the ISO 18013, a family associated with the ISO 23220, W3C Decentralized Identifiers (DIDs), a family associated with the W3C DIDs, International Civil Aviation Organization (ICAO) Digital Travel Credential (DTC), or a family associated with ICAO DTC.

13. The apparatus of claim 10, wherein at least one of the first protocol or the second protocol is at least one of The Commons Project SMART, a family associated with The Commons Project SMART, Decentralized Identity Foundation (DIF), a family associated with the DIF, OpenID Foundation OpenID Connect, a family associated with the OpenID Foundation OpenID Connect, Hyperledger Indy, or a family associated with the Hyperledger Indy.

14. The apparatus of claim 10, wherein the processor is further configured to:
determine that the virtual credential is not valid; and
send, in response to determining that the virtual credential is not valid, a signal to cause the transformed virtual credential to be revoked.

15. The apparatus of claim 10, wherein the request is a first request, the service is a first service, the transformed virtual credential is generated at a first time, and the processor is further configured to:
receive, at a second time after the first time, a second request to access a second service that is different than the first service and associated with the first protocol; and
send, after receiving the second request, the transformed virtual credential to the second service.

16. A non-transitory processor-readable medium storing code representing instructions to be executed by a processor, the instructions comprising code to cause the processor to:
receive, via a first compute device, a first set of data indicating a context of a second compute device associated with a user;
receive, via the first compute device, a virtual credential associated with the user and that is compliant with a second protocol different than a first protocol;
predict, via the first compute device, that the user is going to request access to a secured resource based on the first set of data and a second set of data indicating at least one previous resource access associated with at least one of the user or another user;
determine, via the first compute device and in response to predicting that the user is going to request access to the secured resource, that access to the secured resource involves verification using the first protocol;
transform, via the first compute device and in response to predicting that the user is going to request access to the secured resource, the virtual credential to generate a transformed virtual credential compliant with the first protocol; and
receive, via the first compute device, from the second compute device, after transforming the virtual credential to generate the transformed virtual credential, and after predicting that the user is going to request access to the secured resource, a request to access the secured resource.

17. The non-transitory processor-readable medium of claim 16, wherein the virtual credential is at least one of a mobile driver's license, a mobile passport, a mobile national identification (ID), a mobile state ID, or a mobile provincial ID, and the authorizing entity is a government associated with the at least one of the mobile driver's license, the mobile passport, the mobile national ID, the mobile state ID, or the mobile provincial ID.

18. The non-transitory processor-readable medium of claim 16, wherein at least one of the first protocol or the second protocol is at least one of W3C Verifiable Credentials, a family associated with the W3C Verifiable Credentials, ISO 18013, ISO 23220, a family associated with the ISO 18013, a family associated with the ISO 23220, W3C Decentralized Identifiers (DIDs), a family associated with the W3C DIDs, International Civil Aviation Organization (ICAO) Digital Travel Credential (DTC), or a family associated with ICAO DTC.

19. The non-transitory processor-readable medium of claim 16, wherein the instructions further comprise code to cause the processor to:
store, in response to predicting that the user is going to request access to the secured resource and prior to receiving the request to access the secured resource, a representation of the transformed virtual credential; and
send, in response to predicting that the user is going to request access to the secured resource and prior to receiving the request to access the secured resource, the transformed virtual credential to a compute device associated with the secured resource.

20. The non-transitory processor-readable medium of claim 16, wherein the context includes at least one of a time, an application running on the second compute device, an attribute associated with the user, or a location associated with the user.

* * * * *